(12) United States Patent
Yamamoto et al.

(10) Patent No.: US 10,122,502 B2
(45) Date of Patent: Nov. 6, 2018

(54) COMMUNICATION DEVICE, TRANSMITTING METHOD, AND RECEIVING METHOD

(71) Applicant: Panasonic Intellectual Property Corporation of America, Torrance, CA (US)

(72) Inventors: Tetsuya Yamamoto, Kanagawa (JP); Masayuki Hoshino, Kanagawa (JP); Seigo Nakao, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 101 days.

(21) Appl. No.: 15/298,111

(22) Filed: Oct. 19, 2016

(65) Prior Publication Data
US 2017/0041105 A1    Feb. 9, 2017

Related U.S. Application Data

(63) Continuation of application No. PCT/JP2015/003532, filed on Jul. 13, 2015.

(30) Foreign Application Priority Data

Sep. 25, 2014    (JP) .................................. 2014-195011

(51) Int. Cl.
*H04L 1/18* (2006.01)
*H04J 13/12* (2011.01)
(Continued)

(52) U.S. Cl.
CPC ............ *H04L 1/1896* (2013.01); *H04J 13/12* (2013.01); *H04L 1/16* (2013.01); *H04L 1/1812* (2013.01);
(Continued)

(58) Field of Classification Search
CPC .. H04L 5/0055; H04L 1/1869; H04L 27/2627
See application file for complete search history.

(56) References Cited

U.S. PATENT DOCUMENTS

| 8,532,160 B2 | 9/2013 | Nakao et al. |
| 9,077,506 B2 | 7/2015 | Nakao et al. |

(Continued)

FOREIGN PATENT DOCUMENTS

| CN | 101809911 A | 8/2018 |
| WO | 2008/152819 A1 | 12/2008 |

OTHER PUBLICATIONS

International Search Report of PCT application No. PCT/JP2015/003532 dated Sep. 1, 2015, 4 pages.

(Continued)

*Primary Examiner* — Shukri Taha
(74) *Attorney, Agent, or Firm* — Seed IP Law Group LLP

(57) ABSTRACT

A response signal in each subframe is multiplied by a corresponding one of components forming one of a plurality of first sequences orthogonal to each other. The response signal is also multiplied by a second sequence defined by one of a plurality of cyclic shift indexes and one of a plurality of third sequences orthogonal to each other. Among a plurality of resources, a resource associated with one of at least two first sequences of the plurality of first sequences is different from a resource associated with another one of the at least two first sequences. Each of the plurality of resources is constituted by one of the plurality of cyclic shift indexes and one of the plurality of third sequences.

11 Claims, 14 Drawing Sheets

(51) Int. Cl.
*H04L 1/16* (2006.01)
*H04L 27/01* (2006.01)
*H04L 5/00* (2006.01)
*H04L 27/26* (2006.01)
*H04W 88/02* (2009.01)
*H04W 88/08* (2009.01)

(52) U.S. Cl.
CPC ............ *H04L 5/0055* (2013.01); *H04L 27/01* (2013.01); *H04L 27/2602* (2013.01); *H04L 27/2628* (2013.01); *H04W 88/02* (2013.01); *H04W 88/08* (2013.01)

(56) References Cited

U.S. PATENT DOCUMENTS

| | | | |
|---|---|---|---|
| 9,112,668 | B2 | 8/2015 | Nakao et al. |
| 9,479,319 | B2 | 10/2016 | Nakao et al. |
| 9,716,562 | B2 | 7/2017 | Nakao et al. |
| 9,843,407 | B2 | 12/2017 | Nakao et al. |
| 2009/0241004 | A1* | 9/2009 | Ahn ...................... H04L 1/1812 714/749 |
| 2010/0118919 | A1 | 5/2010 | Nakao et al. |
| 2010/0195702 | A1 | 8/2010 | Nakao et al. |
| 2013/0034126 | A1 | 2/2013 | Nakao et al. |
| 2013/0286975 | A1 | 10/2013 | Nakao et al. |
| 2014/0185561 | A1 | 7/2014 | Nakao et al. |
| 2016/0352446 | A1 | 12/2016 | Nakao et al. |
| 2017/0070310 | A1 | 3/2017 | Nakao et al. |
| 2017/0164335 | A1* | 6/2017 | Yamamoto ............ H04L 5/0053 |
| 2018/0069679 | A1* | 3/2018 | Oizumi ................. H04L 1/1854 |

OTHER PUBLICATIONS

3GPP TS 36.211 V11.5.0, "3$^{rd}$ Generation Partnership Project; Technical Specification Group Radio Access Network; Evolved Universal Terrestrial Radio Access (E-UTRA); Physical channels and modulation (Release 11)", Dec. 2013, 120 pages.

3GPP TS 36.212 V11.4.0, "3$^{rd}$ Generation Partnership Project; Technical Specification Group Radio Access Network; Evolved Universal Terrestrial Radio Access (E-UTRA); Multiplexing and channel coding (Release 11)", Dec. 2013, 84 pages.

3GPP TS 36.213 V11.5.0, "3$^{rd}$ Generation Partnership Project; Technical Specification Group Radio Access Network; Evolved Universal Terrestrial Radio Access (E-UTRA); Physical layer procedures (Release 11)", Dec. 2013, 182 pages.

Seigo Nakao et al., "Performance enhancement of E-UTRA uplink control channel in fast fading environments", Proceeding of 2009 IEEE 69th Vehicular Technology Conference, Apr. 2009, 5 pages.

3GPP TR 36.888 V12.0.0, "3$^{rd}$ Generation Partnership Project; Technical Specification Group Radio Access Network; Study on provision of low-cost Machine-Type Communications (MTC) User Equipments (UEs) based on LTE (Release 12)", Jun. 2013, 55 pages.

R1-140501, Panasonic, "(E)PDCCH coverage enhancement for MTC", 3GPP TSG RAN WG1 Meeting #76, Agenda Item 7.2.2.2.3, Prague, Czech Republic, Feb. 10-14, 2014, 5 pages.

English Translation of Chinese Search Report, dated Nov. 17, 2017, for the related Chinese Patent Application No. 201500169898, 2 pages.

* cited by examiner

COMMUNICATION DEVICE, TRANSMITTING METHOD, AND RECEIVING METHOD

BACKGROUND

1. Technical Field

The present disclosure relates to a communication device, and more particularly to a terminal and a base station, and to a signal transmitting method and a signal receiving method in a terminal and a base station, respectively.

2. Description of the Related Art

In 3rd Generation Partnership Project Long Term Evolution (3GPP LTE), orthogonal frequency division multiple access (OFDMA) is used as a downlink communication method.

In a wireless communication system using 3GPP LTE, hybrid automatic repeat request (HARQ) is applied to downlink data transmitted from a base station (may be referred to as "eNB") to a terminal (may be referred to as "user equipment (UE)"). That is, a terminal feeds back error detection results concerning downlink data to the base station as a response signal. The terminal performs a cyclic redundancy check (CRC) on downlink data. If there is no error in CRC calculation results, the terminal returns acknowledgement (ACK) to the base station as a response signal. If there is any error in CRC calculation results, the terminal returns negative acknowledgement (NACK) to the base station as a response signal. For feeding back error detection results as a response signal (that is, ACK/NACK signal), an uplink control channel such as a physical uplink control channel (PUCCH) is used.

In 3GPP LTE, as shown in FIG. 1, multiple ACK/NACK signals transmitted from plural terminals are spread on the time domain by using zero auto-correction (ZAC) sequences having ZAC characteristics (multiplied by ZAC sequences), and are subjected to code-multiplexing in PUCCH (see, for example, 3GPP TS 36.211 V11.5.0, "Physical channels and modulation (Release 11)", December 2013, 3GPP TS 36.212 V11.4.0, "Multiplexing and channel coding (Release 11)", December 2013, and 3GPP TS 36.213 V11.5.0, "Physical layer procedures (Release 11)", December 2013). In FIG. 1, (W(0), W(1), W(2), W(3)) represent Walsh sequences of a sequence length 4, while (F(0), F(1), F(2)) represent discrete Fourier transform (DFT) sequences of a sequence length 3.

As shown in FIG. 1, in a terminal, an ACK/NACK signal is first subjected to primary spreading in which the ACK/NACK signal is spread into frequency components each corresponding to one single-carrier frequency division multiple access (SC-FDMA) symbol on the frequency domain by using a ZAC sequence (sequence length 12). That is, ACK/NACK signal components represented by a complex number are multiplied by the ZAC sequence (sequence length 12). Then, the ACK/NACK signal subjected to primary spreading and the ZAC sequence as a reference signal are subjected to secondary spreading by using a Walsh sequence (sequence length 4: W(0) through W(3)) and a DFT sequence (sequence length 3: F(0) through F(2)). That is, each component forming the signal of a sequence length 12 (ACK/NACK signal subjected to primary spreading or ZAC sequence as a reference signal) is multiplied by a corresponding one of components of an orthogonal sequence (Walsh sequence or DFT sequence). Then, the signal subjected to secondary spreading is converted into a signal of a sequence length 12 on the time domain by using inverse discrete Fourier transform (IDFT) or inverse fast Fourier transform (IFFT). Then, a cyclic prefix (CP) is added to each component of the resulting signal. As a result, one slot signal constituted by seven SC-FDMA symbols is formed.

PUCCH resources are allocated to each terminal in units of subframes. One subframe is constituted by two slots.

ACK/NACK signals transmitted from different terminals are spread (multiplied) by ZAC sequences defined by different cyclic shift indexes or orthogonal sequences corresponding to different orthogonal cover indexes (OC indexes). The orthogonal sequences are constituted by a combination of Walsh sequences and DFT sequences. The orthogonal sequence may also be referred to as a "block-wise spreading code". Accordingly, by performing despread processing and correlation processing, the base station is able to separate the multiple ACK/NACK signals subjected to code-multiplexing from each other (see, for example, Seigo Nakao, Tomofumi Takata, Daichi Imamura, and Katsuhiko Hiramatsu, "Performance enhancement of E-UTRA uplink control channel in fast fading environments", Proceeding of 2009 IEEE 69th Vehicular Technology Conference (VTC2009-Spring), April 2009). FIG. 2 illustrates PUCCH resources defined by OC indexes 0 through 2 of orthogonal sequences and cyclic shift indexes 0 through 11 of ZAC sequences. If Walsh sequences of a sequence length 4 and DFT sequences of a sequence length 3 are used, a maximum of 3×12=36 PUCCH resources can be defined in the same time-frequency resources. However, it is not always possible that all the 36 PUCCH resources be used. In FIG. 2, for example, for suppressing the transmission performance degradation caused by a timing offset at a terminal, delay spread due to multipath propagation, and inter-code interference due to the movement of a terminal, 18 PUCCH resources (#0 through #17) are used.

As a system for supporting future information society, machine-to-machine (M2M) communication is promising. In M2M communication, services can be provided by autonomous communication between devices without the need of user's judgement. One of the specific applications of the M2M communication system is a smart grid. The smart grid is an infrastructure system for efficiently supplying energy resources such as electricity and gas. For example, the smart grid performs M2M communication between smart meters installed in households and buildings and a central server so as to autonomously and effectively adjust the balance of supply and demand of resources. Other specific applications of the M2M communication system are a monitoring system for commodity control or telemedicine and a remote control system for the stock and billing of vending machines, for example.

In the M2M communication system, the use of a cellular system having a wide communication area is attracting people's attention. In 3GPP, in the LTE and LTE-Advanced standards, M2M based on a cellular network is being developed as the name of machine type communication (MTC). If MTC communication devices such as smart meters are installed in certain locations, such as the basement of a building, they may not be used in an existing communication area. For dealing with such a situation, coverage enhancement for further increasing the communication area is being considered (see, for example, 3GPP TR 36.888 V12.0.0, "Study on provision of low-cost Machine-Type Communications (MTC) User Equipments (UEs) based on LTE", June 2013).

In MTC coverage enhancement, for further increasing the communication area, repetition transmission in which the same signal is transmitted multiple times, more specifically, the execution of repetition transmission in PUCCH, is being considered. In a base station, which is a receiving side of PUCCH, by combining repeatedly transmitted signals, received signal power can be enhanced, thereby making it possible to increase a communication area.

SUMMARY

In repetition transmission, one ACK/NACK signal is repeatedly transmitted over multiple subframes. Accordingly, the overhead of a control signal is increased, and the frequency usage efficiency is decreased. In PUCCH, signals from different terminals are multiplexed by using different PUCCH resources (cyclic shift indexes and orthogonal sequences), as discussed above. On the other hand, in the MTC system, there will be a great number of terminals within a cell, and in accordance with an increased number of terminals, sufficient PUCCH resources may not be provided.

One non-limiting and exemplary embodiment provides a communication device, a transmitting method, and a receiving method in which, in performing repetition transmission in an MTC coverage enhancement mode, PUCCH resources are secured and the transmission performance degradation caused by inter-code interference can be suppressed.

In one general aspect, the techniques disclosed here feature a communication device including a generator and a spreader. The generator repeats a response signal over multiple subframes in response to a data signal and multiplies the response signal in each of the multiple subframes by a corresponding one of components forming one of a plurality of first sequences orthogonal to each other. The spreader multiplies the response signal by a second sequence defined by one of a plurality of cyclic shift indexes and one of a plurality of third sequences orthogonal to each other. Among a plurality of resources, a resource associated with one of at least two first sequences of the plurality of first sequences is different from a resource associated with another one of the at least two first sequences. Each of the plurality of resources is constituted by one of the plurality of cyclic shift indexes and one of the plurality of third sequences.

It should be noted that general or specific embodiments may be implemented as a system, a method, an integrated circuit, a computer program, a storage medium, or any selective combination thereof.

According to an aspect of the present disclosure, it is possible to secure PUCCH resources and to suppress the transmission performance degradation caused by inter-code interference, in performing repetition transmission in an MTC coverage enhancement mode.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
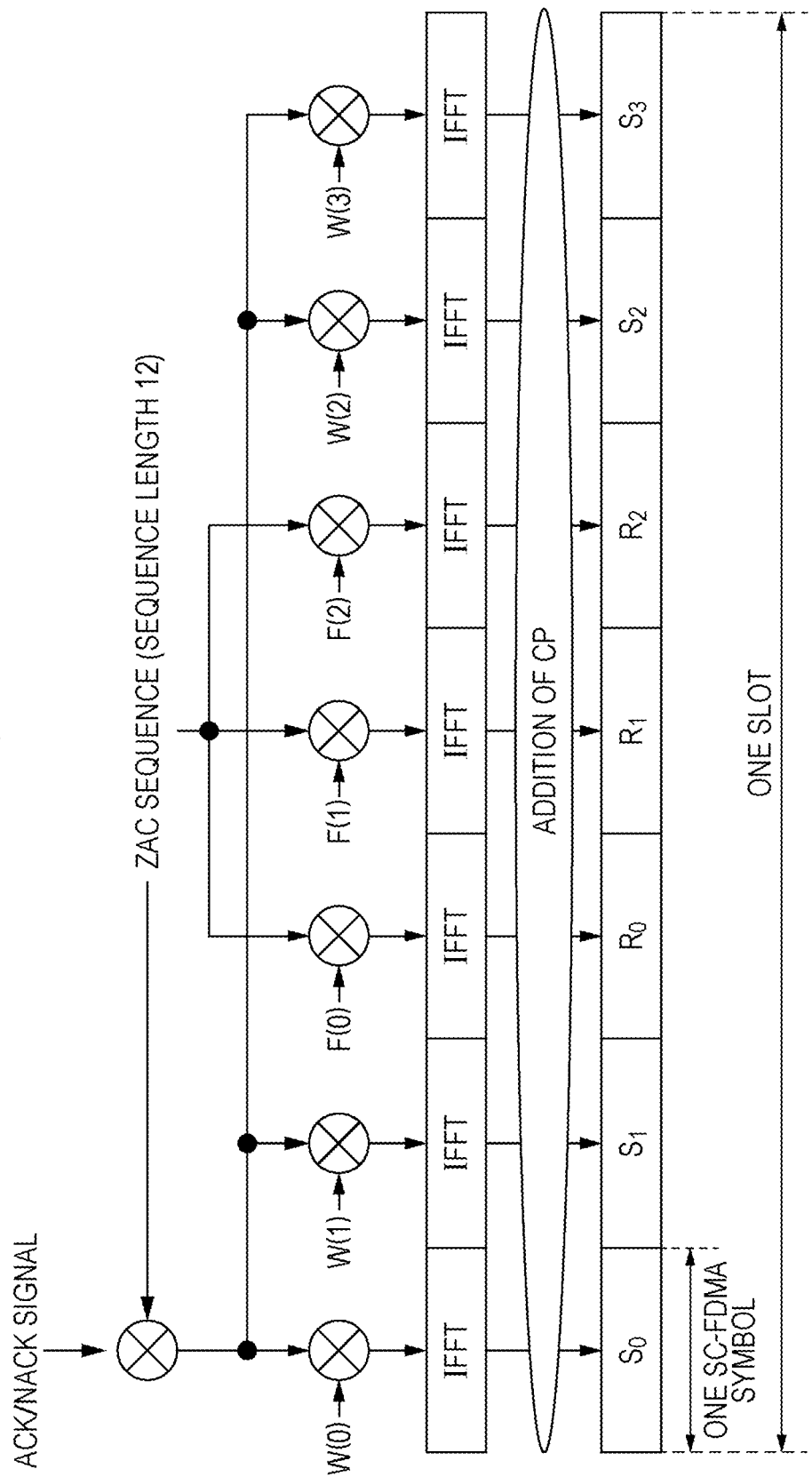
FIG. 1 illustrates an example of the spreading of a response signal and a reference signal.
Figure 2:
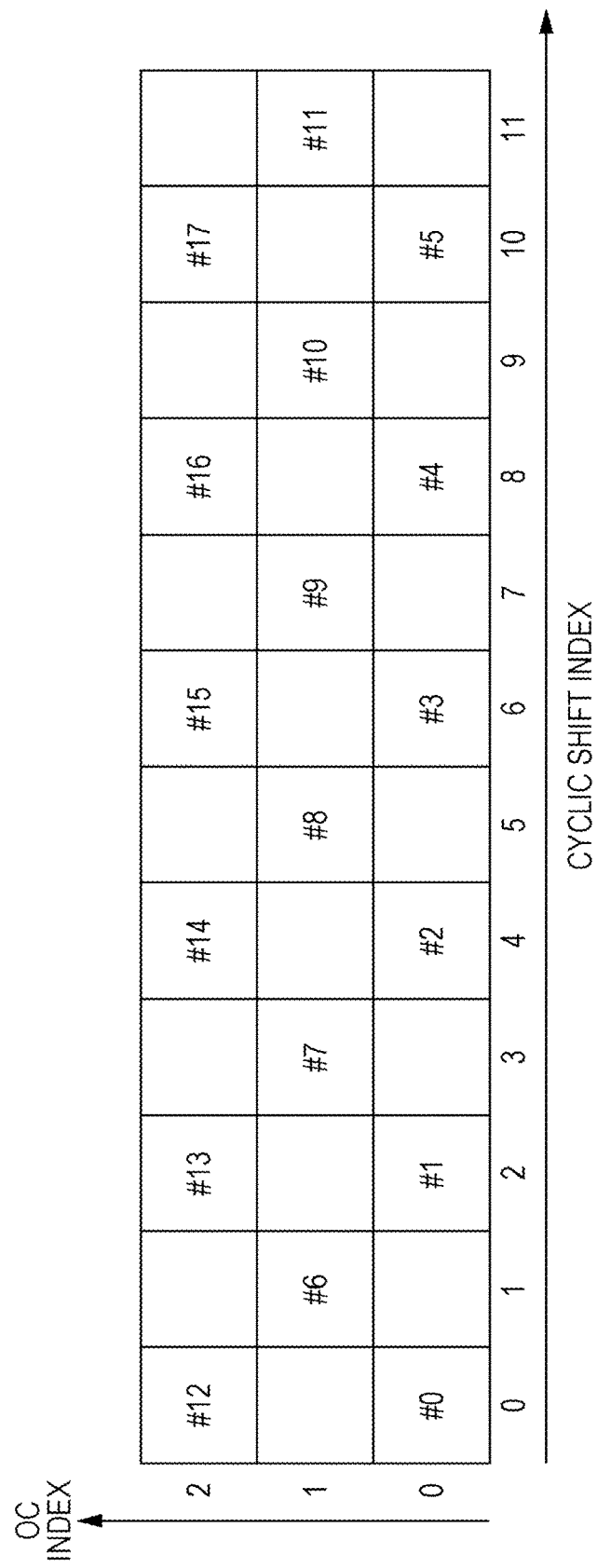
FIG. 2 illustrates examples of PUCCH resources.

DETAILED DESCRIPTION (Underlying Knowledge Forming Basis of the Present Disclosure)

When a terminal which performs MTC coverage enhancement (also referred to as "a terminal which performs repetition transmission" or "a terminal in an MTC coverage enhancement mode") performs repetition transmission over multiple subframes in PUCCH, inter-subframe spreading may be conducted by multiplying a signal in each subframe by a corresponding one of components of an orthogonal sequence. By conducting inter-subframe spreading, PUCCH resources can be increased, compared with a case in which repetition transmission is simply performed without conducting inter-subframe spreading. In the following description, an orthogonal sequence used in inter-subframe spreading will be referred to as "an inter-subframe orthogonal sequence".

In this case, however, upon receiving a signal spread by an inter-subframe orthogonal sequence, a base station has to despread the signal over multiple subframes. If inter-subframe spreading is not conducted, consideration has to be given only to the orthogonality among orthogonal sequences within one subframe, and the influence of a time variation in a channel between a terminal and a base station can sufficiently be eliminated. In contrast, if inter-subframe spreading is conducted, it is necessary to maintain the orthogonality among inter-subframe orthogonal sequences in multiple subframes (the number of subframes corresponds to the spreading factor of inter-subframe spreading). If the orthogonality among inter-subframe orthogonal sequences is disturbed, inter-code interference is likely to occur. As a result, transmission performance may be degraded.

Embodiments of the present disclosure will be described below in detail with reference to the accompanying drawings.

[Overview of Communication System]

A communication system according to the embodiments of the present disclosure is a system supporting LTE-Advanced, for example. The communication system includes a base station 100 and a terminal 200 (see FIGS. 5 and 6) as communication devices.

It is assumed that plural terminals 200 in the MTC coverage enhancement mode are located within the cell of the base station 100. In the MTC coverage enhancement mode, each terminal 200 repeatedly transmits PUCCH over multiple subframes (repetition transmission). In repetition transmission, for example, the same signal is transmitted multiple times over multiple subframes by associating each subframe with one time of transmission. That is, the terminal 200 repeatedly transmits the same response signal (ACK/NACK signal) a predetermined number of repetition times (hereinafter referred to as "the repetition number", which may also referred to as "the repetition level" or "the repetition factor") in the predetermined number of consecutive subframes. When transmitting the response signal, the terminal 200 multiplies the response signal in each subframe by a corresponding one of components of an inter-subframe orthogonal sequence.

Figure 3:
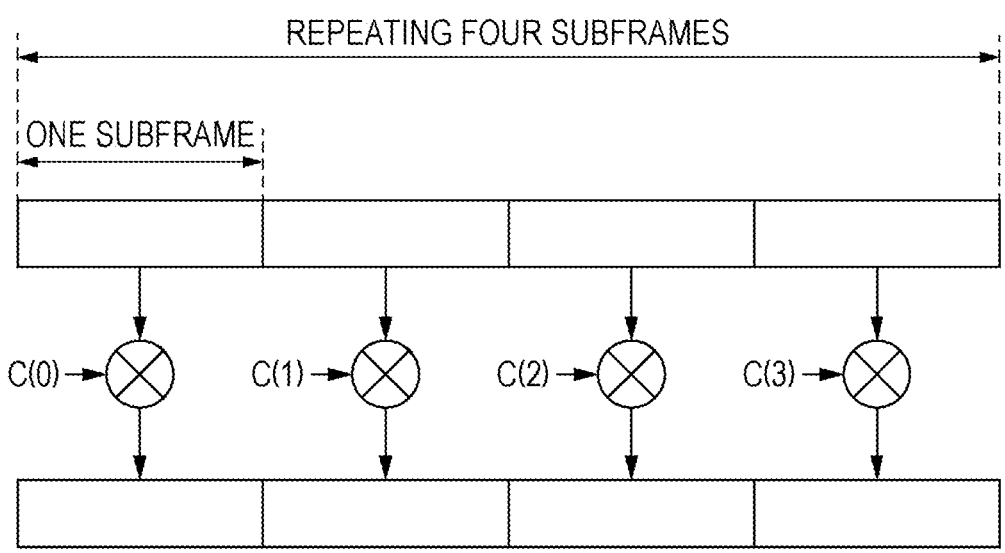
FIG. 3 illustrates an example of the spreading of an ACK/NACK signal.

For example, if repetition transmission is performed a number of times $N_{Rep}$ (that is, the repetition number $N_{Rep}$), the terminal 200 repeatedly transmits a response signal for one subframe over $N_{Rep}$ subframes. When transmitting the response signal, the terminal 200 multiplies the response signal in each subframe by a corresponding one of the components (C(0) through $C(N_{SF}-1)$, where $N_{SF}$ represents the sequence length or the spreading factor) of an inter-subframe orthogonal sequence. FIG. 3 illustrates an example of the spreading of a response signal when the repetition number $N_{Rep}$ is 4 and the sequence length $N_{SF}$ of the inter-subframe orthogonal sequence is 4. The sequence length or spreading factor $N_{SF}$ of the inter-subframe orthogonal sequence may be the same value as the repetition number $N_{Rep}$, or may be a predetermined value (for example, a cell-specific value).

In this manner, each terminal 200 multiplies a response signal in each of multiple subframes by a corresponding one of components forming one of plural inter-subframe orthogonal sequences orthogonal to each other. That is, for a response signal to be transmitted through PUCCH, the terminal 200 performs, not only intra-subframe spreading within each subframe by using a ZAC sequence defined by a cyclic shift index and an intra-subframe orthogonal sequence, but also inter-subframe spreading over multiple subframes by using an inter-subframe orthogonal sequence.

As described above, an orthogonal sequence used within each subframe (or each slot) (see FIG. 1) is called an intra-subframe orthogonal sequence so that it can be distinguished from an inter-subframe orthogonal sequence.

Plural response signals transmitted from the plural terminals 200 are spread by using ZAC sequences defined by different cyclic shift indexes, intra-subframe orthogonal sequences corresponding to different orthogonal cover indexes (OC indexes), and inter-subframe orthogonal sequences corresponding to different inter-subframe (SF) OC indexes. Meanwhile, the base station 100 first performs despread processing and correlation processing regarding the inter-subframe orthogonal sequences, and then performs despread processing and correlation processing regarding the intra-subframe orthogonal sequences and the ZAC sequences. As a result, in the base station 100, multiple response signals subjected to code-multiplexing can be separated from each other.

The base station 100 may implicitly inform each terminal 200 of PUCCH resources (cyclic shift index, intra-subframe orthogonal sequence, and inter-subframe orthogonal sequence) used by the terminal 200 for transmitting a response signal by associating the PUCCH resources with control channel element (CCE) numbers on which downlink control information is mapped. Alternatively, the base station 100 may dynamically or semi-statically inform each terminal 200 of such PUCCH resources by using a downlink control signal, for example.

Figure 4:
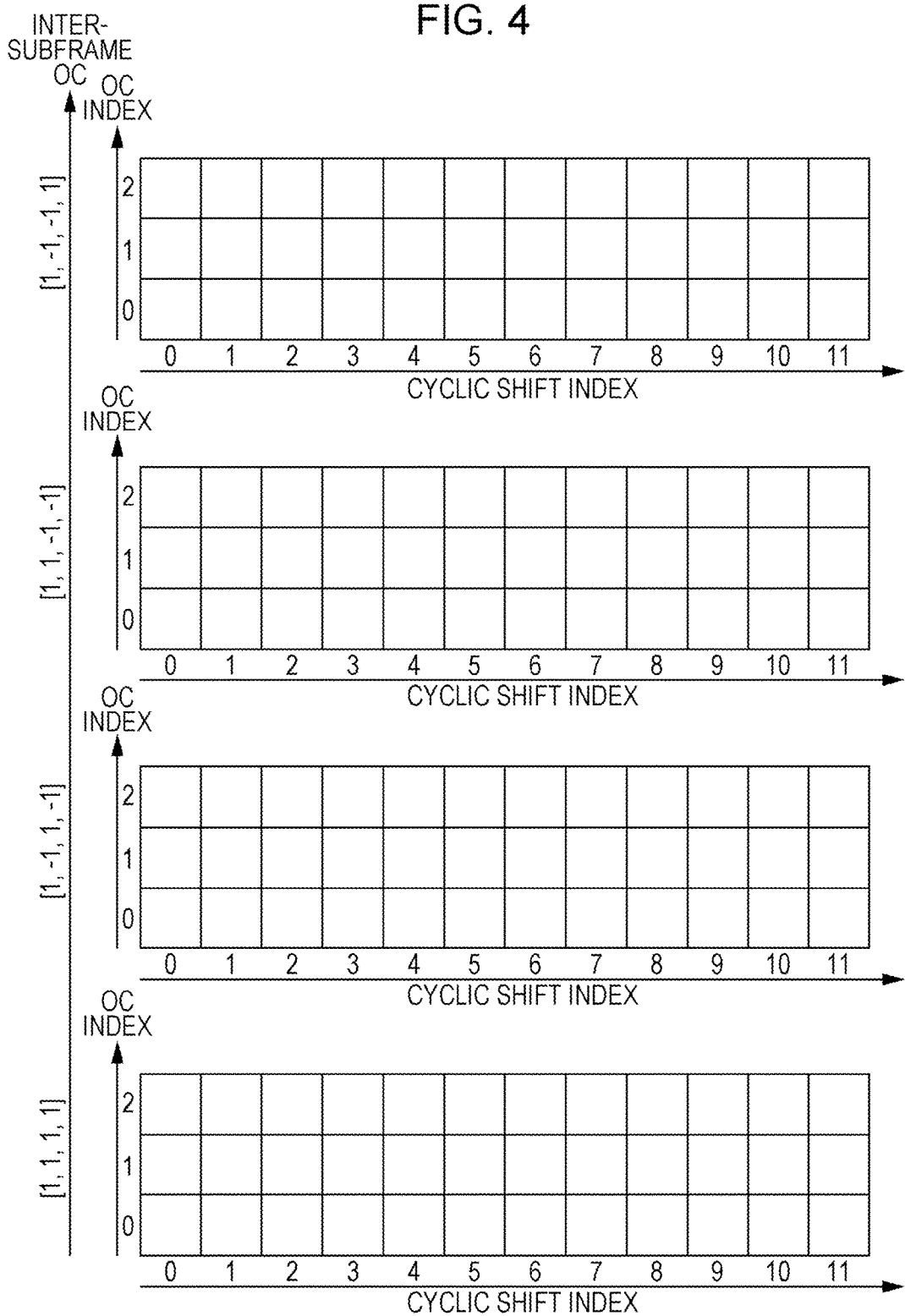
FIG. 4 illustrates examples of PUCCH resources.

FIG. 4 illustrates an example of PUCCH resources defined by cyclic shift indexes of ZAC sequences, OC indexes of intra-subframe orthogonal sequences, and inter-SF OC indexes of inter-subframe orthogonal sequences. In FIG. 4, twelve cyclic shift indexes, four Walsh sequences of a sequence length 4 as the inter-subframe orthogonal sequences, and three Walsh sequences of a sequence length 3 (or three DFT sequences of a sequence length 3) as the intra-subframe orthogonal sequences are used. In this case, a maximum of 4×3×12=144 PUCCH resources may be used for subframes to be used for repetition transmission.

Instead of ZAC sequences, other sequences may be used as long as they are defined by different cyclic shift indexes. Instead of Walsh sequences, other sequences may be used as long as they are orthogonal to each other.

If the sequence length of inter-subframe orthogonal sequences is a power of 2, Walsh sequences may be used as the inter-subframe orthogonal sequences. For example, if $N_{SF}=4$, the inter-subframe orthogonal sequences (C(0), C(1), C(2), C(3)) are represented by (1,1,1,1), (1,−1,1,−1), (1,1,−1,−1), and (1,−1,−1,1), respectively. If the sequence length of inter-subframe orthogonal sequences is not a power of 2, complex spread codes may be used as the inter-subframe orthogonal sequences. For example, if $N_{SF}=5$, the inter-subframe orthogonal sequences (C(0), C(1), C(2), C(3), C(4)) are represented by (1,1,1,1,1), $(1,e^{j2\pi/5},e^{j4\pi/5},e^{j6\pi/5},e^{j8\pi/5})$, $(1,e^{j8\pi/5},e^{j6\pi/5},e^{j4\pi/5},e^{j2\pi/5})$, $(1,e^{j4\pi/5},e^{j8\pi/5},e^{j2\pi/5},e^{j6\pi/5})$, and $(1,e^{j6\pi/5},e^{j2\pi/5},e^{j8\pi/5},e^{j4\pi/5})$, respectively.

In this manner, when repetition transmission is performed, by multiplying a signal in each subframe to be repeatedly transmitted by a corresponding one of components of an inter-subframe orthogonal sequence (see FIG. 4), PUCCH resources, which is at a maximum of a multiple number of the sequence length of the inter-subframe orthogonal sequences, may be used. However, it is not always possible that all the 144 PUCCH resources shown in FIG. 4 be used.

Figure 5:
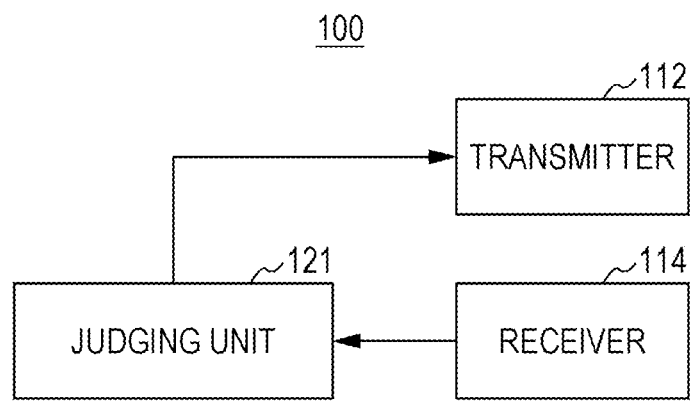
FIG. 5 is a block diagram illustrating the configuration of the major part of a base station according to embodiments of the present disclosure.

FIG. 5 is a block diagram illustrating the configuration of the major part of the base station 100 according to the embodiments of the present disclosure. In the base station 100, a transmitter 112 transmits a data signal to a terminal 200. A receiver 114 receives a response signal (ACK/NACK signal) which is repeatedly transmitted over multiple subframes in response to a data signal. The response signal in each of the multiple subframes is multiplied by a corresponding one of components forming one of inter-subframe orthogonal sequences (first sequences) orthogonal to each other. The response signal is also multiplied by a ZAC sequence (second sequence) defined by one of plural cyclic shift indexes and by one of plural intra-subframe orthogonal sequences (third sequences) orthogonal to each other. A judging unit 121 judges whether the received response signal indicates ACK or NACK.

Figure 6:
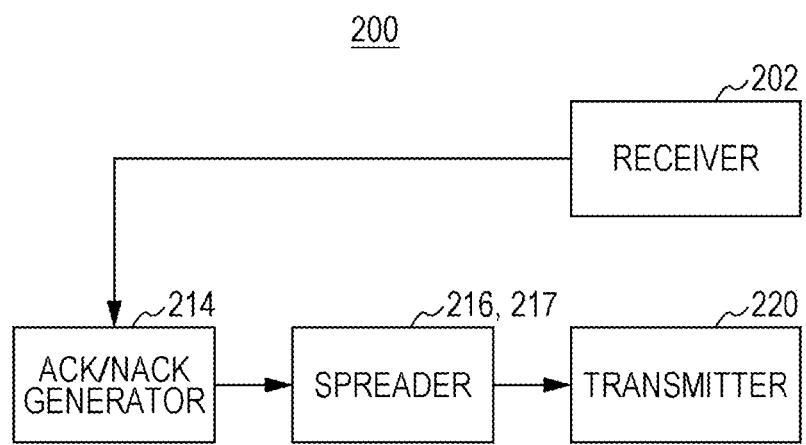
FIG. 6 is a block diagram illustrating the configuration of the major part of a terminal according to embodiments of the present disclosure.

FIG. 6 is a block diagram illustrating the configuration of the major part of the terminal 200 according to the embodiments of the present disclosure. In the terminal 200, a receiver 202 receives a data signal transmitted from the base station 100. An ACK/NACK generator 214 repeats a response signal over multiple subframes in response to a received data signal, and multiplies the response signal in each of the multiple subframes by a corresponding one of components forming one of multiple inter-subframe orthogonal sequences (first sequences) orthogonal to each other. A spreader 216 (217) multiplies the response signal in each subframe by a ZAC sequence (second sequence) defined by one of plural cyclic shift indexes and by one of plural intra-subframe orthogonal sequences (third sequences) orthogonal to each other. A transmitter 220 transmits the response signal to the base station 100.

One resource is constituted by one of the plural cyclic shift indexes and one of the plural intra-subframe orthogonal sequences. That is, plural resources are constituted by plural cyclic shift indexes and plural intra-subframe orthogonal sequences. Each of the plural inter-subframe orthogonal sequences is associated with at least one resource. At least two of the plural inter-subframe orthogonal sequences are associated with different resources among plural resources. That is, a resource associated with one of the plural inter-subframe orthogonal sequences is different from a resource associated with another one of the plural inter-subframe orthogonal sequences.

First Embodiment

[Configuration of Base Station]

Figure 7:
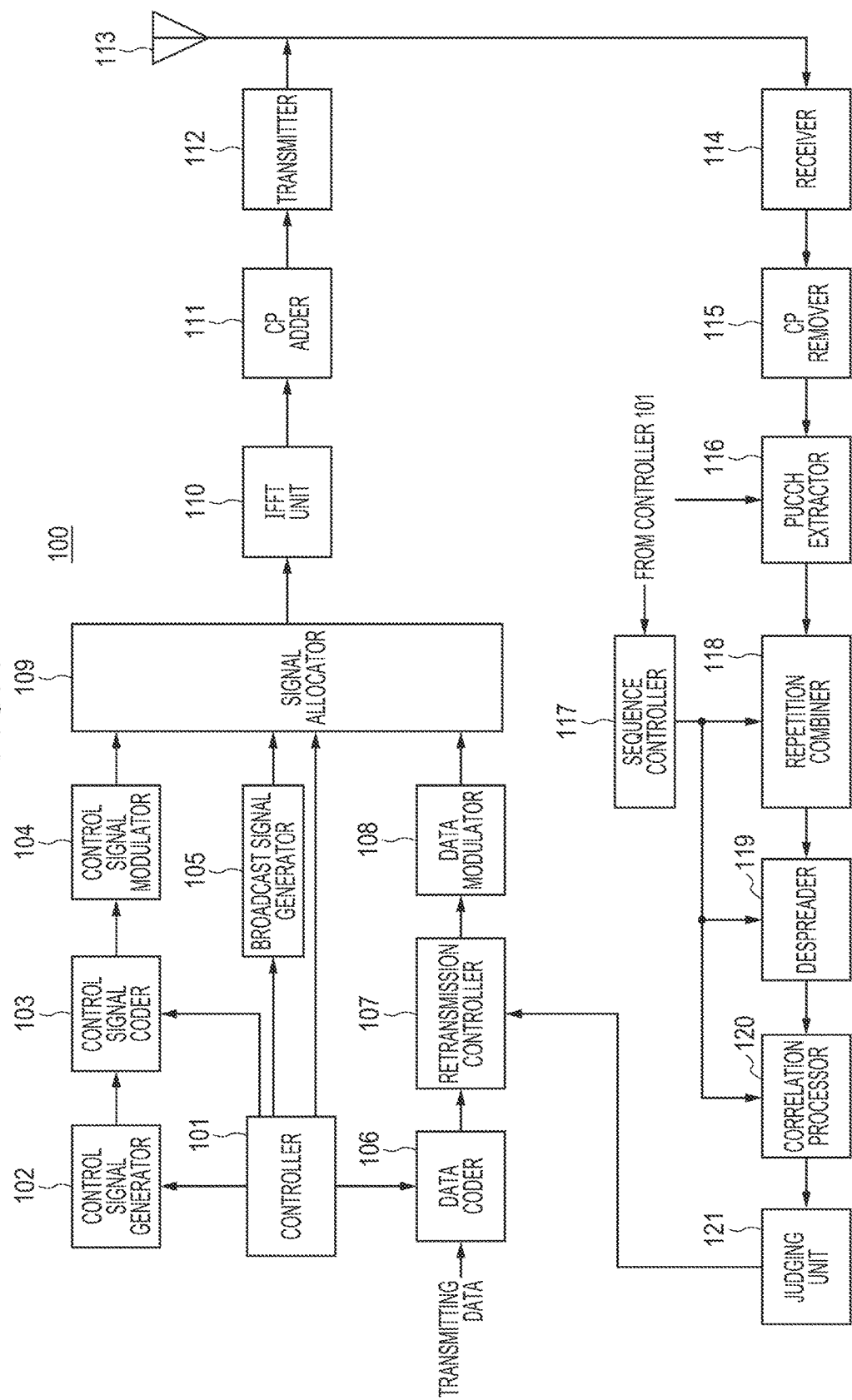
FIG. 7 is a block diagram illustrating the configuration of the base station according to the first embodiment.

FIG. 7 is a block diagram illustrating the configuration of the base station 100 according to a first embodiment of the present disclosure. In FIG. 7, the base station 100 includes a controller 101, a control signal generator 102, a control signal encoder 103, a control signal modulator 104, a broadcast signal generator 105, a data encoder 106, a retransmission controller 107, a data modulator 108, a signal allocator 109, an IFFT unit 110, a CP adder 111, the transmitter 112, an antenna 113, the receiver 114, a CP remover 115, a PUCCH extractor 116, a sequence controller 117, a repetition combiner 118, a despreader 119, a correlation processor 120, and the judging unit 121.

The elements of the base station 100 shown in FIG. 7 are only examples, and at least some of the elements may be replaced by other elements or omitted. Not all the elements are necessary for carrying out an embodiment of the present disclosure.

The controller 101 allocates a downlink resource for transmitting control information to the terminal 200 (downlink control information allocation resource) and a downlink resource for transmitting downlink data (transmitting data) represented by the control information to the terminal 200 (downlink data allocation resource). The downlink control information allocation resource is constituted by one or plural CCEs. If PUCCH resources are implicitly indicated by using CCEs, each CCE is associated with PUCCH resources (cyclic shift index, intra-subframe orthogonal sequence, and inter-subframe orthogonal sequence) in a PUCCH region.

The controller 101 also selects PUCCH resources (cyclic shift index, intra-subframe orthogonal sequence, and inter-subframe orthogonal sequence) to be used by the terminal 200. The controller 101 outputs information concerning a cyclic shift index and orthogonal sequences (intra-subframe orthogonal sequence and inter-subframe orthogonal sequence) which may be used for spreading PUCCH signals (response signal and reference signal) to be transmitted from the terminal 200 to the sequence controller 117, and outputs information concerning the frequency to the PUCCH extractor 116.

The controller 101 also decides the coding rate to be used for transmitting control information to the terminal 200 and outputs the decided coding rate to the control signal encoder 103. The controller 101 also decides the coding rate to be used for transmitting downlink data to the terminal 200 and outputs the decided coding rate to the data encoder 106.

The amount of data of control information varies according to the decided coding rate. Accordingly, in accordance with the amount of data, the controller 101 allocates a downlink control information allocation resource constituted by CCEs on which control information can be mapped. The controller 101 outputs information concerning the downlink data allocation resource to the control signal generator 102. The controller 101 outputs information concerning the downlink data allocation resource and the downlink control information allocation resource to the signal allocator 109.

If the MTC coverage enhancement mode is set in the terminal 200, the controller 101 outputs information concerning the repetition number set in the terminal 200 to the control signal generator 102.

The controller 101 also instructs the broadcast signal generator 105 to generate a broadcast signal based on the parameter determined for the base station 100.

The controller 101 also generates information concerning PUCCH resources and outputs the generated information to the control signal generator 102. Information concerning PUCCH resources is a parameter for making it possible to specify PUCCH resources by the terminal 200. An example of information concerning PUCCH resources is information concerning the maximum number of PUCCH resources that can be subjected to code-multiplexing per resource block to be disposed in a PUCCH region. Information concerning PUCCH resources may be indicated to the terminal 200 as broadcast information (cell-specific value) or as higher layer signaling.

The control signal generator 102 generates a control signal by using information (information concerning the downlink data allocation resource or information concerning the PUCCH repetition number) received from the controller 101, and outputs the generated control signal to the control signal encoder 103. If there are plural terminals 200, the control signal includes information concerning a terminal ID used for distinguishing a subject terminal 200 from the other terminals 200, for example, information concerning CRC bits masked by the terminal ID.

The control signal encoder 103 encodes the control signal received from the control signal generator 102 in accordance with the coding rate received from the controller 101, and outputs the coded control signal to the control signal modulator 104.

The control signal modulator 104 modulates the control signal received from the control signal encoder 103, and outputs the modulated control signal to the signal allocator 109.

The broadcast signal generator 105 generates a broadcast signal in accordance with the instruction from the controller 101, and outputs the generated broadcast signal to the signal allocator 109. The broadcast signal may be coded and modulated.

The data encoder 106 performs error correcting coding, such as turbo coding, on transmitting data (bit sequence, that is, downlink data) in accordance with the coding rate received from the controller 101, and outputs the coded data signal (coded bit sequence) to the retransmission controller 107.

If the coded data signal received from the data encoder 106 is transmitted for the first time, the retransmission controller 107 retains the coded data signal and also outputs the coded data signal to the data modulator 108. Upon receiving a NACK response for a transmitted data signal from the judging unit 121, which will be discussed later, the retransmission controller 107 outputs corresponding retained data to the data modulator 108. Upon receiving an ACK response for a transmitted data signal from the judging unit 121, the retransmission controller 107 deletes corresponding retained data.

The data modulator 108 modulates the data signal received from the retransmission controller 107, and outputs the modulated data signal to the signal allocator 109.

The signal allocator 109 maps the control signal received from the control signal modulator 104, the broadcast signal received from the broadcast signal generator 105, and the modulated data signal received from the data modulator 108 onto downlink resources (such as a downlink data allocation resource and a downlink control information allocation resource), and outputs the mapped signals to the IFFT unit 110. More specifically, the signal allocator 109 maps the control signal onto the resource indicated by the information concerning the downlink control information allocation resource received from the controller 101 and maps the modulated data signal onto the resource indicated by the information concerning the downlink data allocation resource received from the controller 101. The signal allocator 109 also maps the broadcast signal onto a preset time-frequency resource.

The IFFT unit 110 performs IFFT processing on the resulting signal received from the signal allocator 109 so as to convert the frequency domain signal into a time domain signal. The IFFT unit 110 outputs the time domain signal to the CP adder 111.

The CP adder 111 adds CPs to the signal received from the IFFT unit 110 and outputs the resulting signal (OFDM signal) to the transmitter 112.

The transmitter 112 performs radio frequency (RF) processing, such as digital-to-analog (D/A) conversion and up-conversion, on the OFDM signal received from the CP adder 111, and outputs the wireless signal to the terminal 200 via the antenna 113.

The receiver 114 performs RF processing, such as down-conversion and analog-to-digital (A/D) conversion, on a wireless signal received from the terminal 200 via the antenna 113, and outputs the resulting signal to the CP remover 115.

The CP remover 115 removes CPs added to the signal received from the receiver 114, and outputs the resulting signal to the PUCCH extractor 116.

The PUCCH extractor 116 extracts an uplink control channel (PUCCH) signal from the signal received from the CP remover 115, based on the information received from the controller 101, and outputs the extracted PUCCH signal to the repetition combiner 118.

Based on the information concerning a cyclic shift index and orthogonal sequences (intra-subframe orthogonal sequence and inter-subframe orthogonal sequence) received from the controller 101, the sequence controller 117 generates a ZAC sequence defined by the cyclic shift index and orthogonal sequences (intra-subframe orthogonal sequence and inter-subframe orthogonal sequence) which may be used for spreading a response signal and a reference signal to be transmitted from the terminal 200. The sequence controller 117 outputs the inter-subframe orthogonal sequence to the repetition combiner 118, the intra-subframe orthogonal sequence to the despreader 119, and the ZAC sequence to the correlation processor 120.

The repetition combiner 118 performs coherent combining on PUCCH (response signal and reference signal) repeatedly transmitted over multiple subframes so as to combine the ACK/NACK signal and the reference signal in the multiple subframes by using the inter-subframe orthogonal sequence received from the sequence controller 117, thereby generating a combined signal. The repetition combiner 118 then outputs the combined signal to the despreader 119.

By using the intra-subframe orthogonal sequence (orthogonal sequence used for spreading a response signal by the terminal 200) received from the sequence controller 117, the despreader 119 despreads the response signal included in the combined signal received from the repetition combiner 118, and outputs the despread signal to the correlation processor 120. By using the intra-subframe orthogonal sequence, the despreader 119 also despreads the reference signal included in the combined signal received from the repetition combiner 118, and outputs the despread signal to the correlation processor 120.

The correlation processor 120 finds the correlation value between the ZAC sequence received from the sequence controller 117 (ZAC sequence defined by the cyclic shift index used for spreading the response signal by the terminal 200) and the despread signal (response signal or reference signal) received from the despreader 119, and outputs the correlated value to the judging unit 121.

The judging unit 121 judges whether the response signal transmitted from the terminal 200 indicates ACK or NACK for the data transmitted from the base station 100, based on the correlation value received from the correlation processor 120, and outputs the judging result to the retransmission controller 107.

[Configuration of Terminal]

Figure 8:
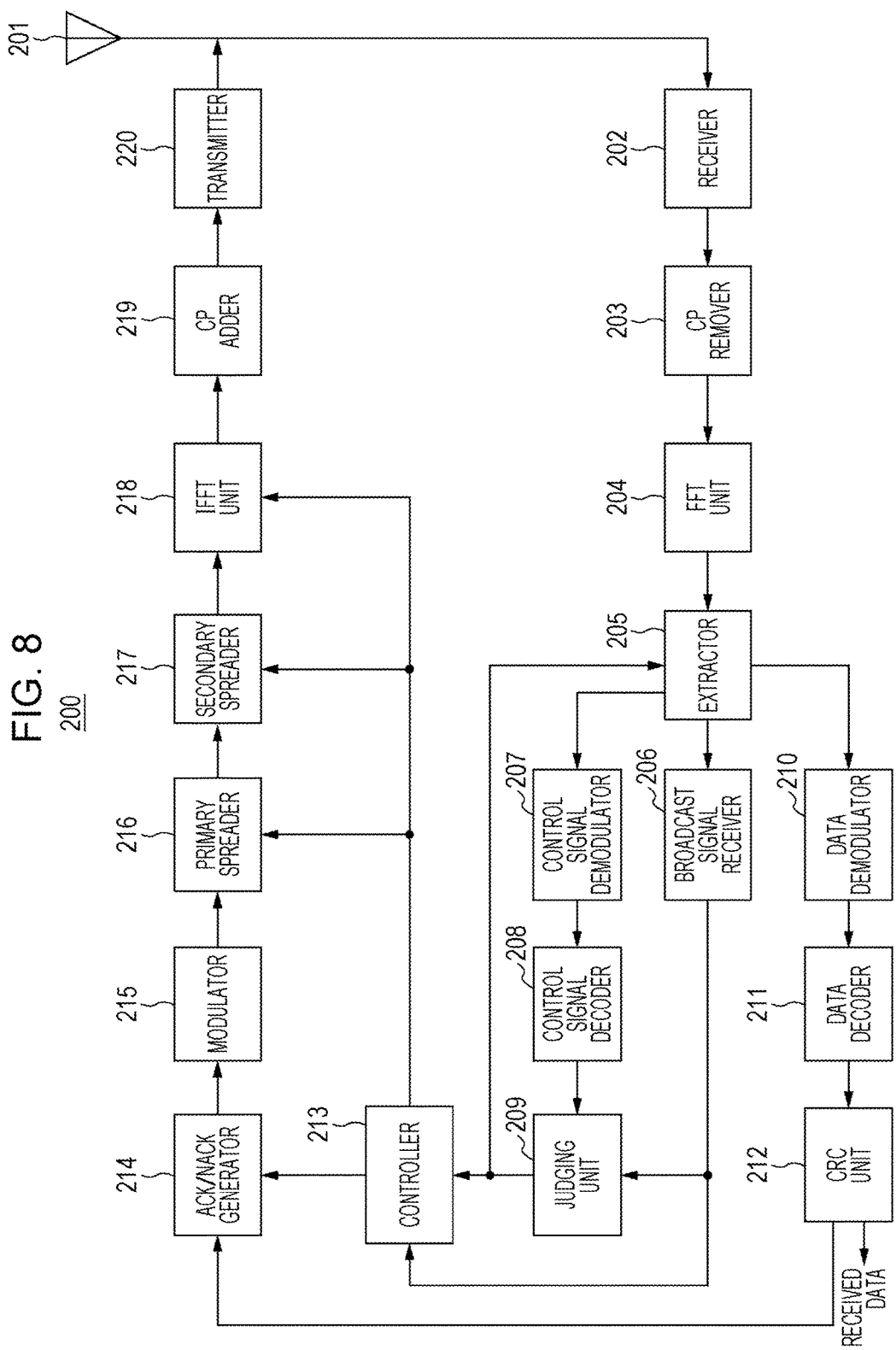
FIG. 8 is a block diagram illustrating the configuration of the terminal according to the first embodiment.

FIG. 8 is a block diagram illustrating the configuration of the terminal 200 according to the first embodiment of the present disclosure. In FIG. 8, the terminal 200 includes an antenna 201, the receiver 202, a CP remover 203, a fast Fourier transform (FFT) unit 204, an extractor 205, a broadcast signal receiver 206, a broadcast signal demodulator 207, a control signal decoder 208, a judging unit 209, a data demodulator 210, a data decoder 211, a CRC unit 212, a controller 213, the ACK/NACK generator 214, a modulator 215, a primary spreader 216, a secondary spreader 217, an IFFT unit 218, a CP adder 219, and the transmitter 220.

The elements of the terminal 200 shown in FIG. 8 are only examples, and at least some of the elements may be replaced by other elements or omitted. Not all the elements are necessary for carrying out an embodiment of the present disclosure.

The receiver 202 performs RF processing, such as down-conversion and A/D conversion, on a wireless signal received from the base station 100 via the antenna 201 so as to obtain a baseband OFDM signal. The receiver 202 then outputs the OFDM signal to the CP remover 203.

The CP remover 203 removes CPs added to the OFDM signal received from the receiver 202, and outputs the resulting signal to the FFT unit 204.

The FFT unit 204 performs FFT processing so as to convert the time domain signal into a frequency domain signal, and outputs the frequency domain signal to the extractor 205.

The extractor 205 extracts a broadcast signal from the frequency domain signal received from the FFT unit 204 and outputs it to the broadcast signal receiver 206. Since the resource onto which the broadcast signal is mapped is determined in advance, the extractor 205 obtains the broadcast signal by extracting information mapped on this resource. The extracted broadcast signal may include a signal indicating information concerning PUCCH resources.

The extractor 205 also extracts a physical downlink control channel (PDCCH) signal from the frequency domain signal received from the FFT unit 204, and outputs the extracted PDCCH signal to the control signal demodulator 207. The extractor 205 also extracts physical downlink shared channel (PDSCH) signal (downlink data) from the frequency domain signal received from the FFT unit 204, based on information concerning the downlink data allocation resource allocated to the terminal 200 received from the judging unit 209, and outputs the PDSCH signal to the data demodulator 210. The PDCCH signal includes information concerning the downlink data allocation resource and the PUCCH repetition number, for example.

The broadcast signal receiver 206 obtains information concerning PUCCH resources from the broadcast signal received from the extractor 205. If the broadcast signal is coded and modulated, the broadcast signal receiver 206 demodulates and decodes the broadcast signal. The broadcast signal receiver 206 outputs the broadcast signal to the judging unit 209 or the controller 213.

The control signal demodulator 207 demodulates the PDCCH signal received from the extractor 205, and outputs the demodulated PDCCH signal to the control signal decoder 208.

The control signal decoder 208 decodes the PDCCH signal received from the control signal demodulator 207, and outputs decoding results to the judging unit 209.

The judging unit 209 makes a blind decoding for judging whether or not the control information included in the decoding results received from the control signal decoder 208 is control information addressed to the terminal 200. For example, the judging unit 209 demasks the CRC bits indicated by the control information by using the terminal ID of the terminal 200, and if there is no error in CRC calculation results, the judging unit 209 judges that the control information is addressed to the terminal 200. The judging unit 209 then outputs information concerning the downlink data allocation resource indicated by the control information addressed to the terminal 200 to the extractor 205. The judging unit 209 also specifies CCEs on which the control information addressed to the terminal 200 is mapped, and outputs the identification (ID) information (CCE numbers) concerning the specified CCEs to the controller 213.

The data demodulator 210 demodulates the downlink data received from the extractor 205, and outputs the demodulated downlink data to the data decoder 211.

The data decoder 211 decodes the downlink data received from the data demodulator 210, and outputs the decoded downlink data to the CRC unit 212.

The CRC unit 212 performs error detection on the downlink data received from the data decoder 211 by using CRC, and outputs error detection results to the ACK/NACK generator 214. If the error detection results indicate that there is no error in the downlink data, the CRC unit 212 outputs the downlink data as the received data.

The controller 213 retains in advance information concerning PUCCH resources (offset values used for specifying PUCCH resource numbers from CCE numbers or the maximum number of PUCCH resources that can be subjected to code-multiplexing per resource block to be disposed in each PUCCH region) indicated from the base station 100 to the terminal 200 by a broadcast signal or higher layer signaling and information concerning the repetition number.

The controller 213 specifies PUCCH resources (frequency, cyclic shift index, and orthogonal sequences) corresponding to the CCE ID information received from the judging unit 209 by using the information concerning PUCCH resources and the CCE ID information. That is, the controller 213 specifies the PUCCH resources based on the CCE ID information.

The controller 213 generates a ZAC sequence defined by the cyclic shift index corresponding to the PUCCH resources, and outputs the generated ZAC sequence to the primary spreader 216. The controller 213 also outputs the inter-subframe orthogonal sequence corresponding to the PUCCH resources to the ACK/NACK generator 214, and outputs the intra-subframe orthogonal sequence corresponding to the PUCCH resources to the secondary spreader 217. The controller 213 also outputs frequency resources (subcarriers) corresponding to the PUCCH resources to the IFFT unit 218.

If the MTC coverage enhancement mode is set in the terminal 200, the controller 213 outputs information concerning the PUCCH repetition number to the ACK/NACK generator 214.

The ACK/NACK generator 214 generates a response signal in response to the received downlink data (data signal), based on the error detection results received from the CRC unit 212. More specifically, if the error detection results indicate that errors are detected, the ACK/NACK generator 214 generates a response signal indicating NACK. If the error detection results indicate that no errors are detected, the ACK/NACK generator 214 generates a response signal indicating ACK. The ACK/NACK generator 214 outputs the generated response signal to the modulator 215.

If the MTC coverage enhancement mode is set in the terminal 200, the ACK/NACK generator 214 repeats a response signal in accordance with the information concerning the repetition number received from the controller 213. That is, if the PUCCH repetition number is greater than one, the ACK/NACK generator 214 outputs the same response signal over the same number of continuous subframes as the repetition number to the modulator 215. If the MTC coverage enhancement mode is set in the terminal 200, the ACK/NACK generator 214 multiplies the response signal over the continuous subframes by the inter-subframe orthogonal sequence received from the controller 213.

The modulator 215 modulates the response signal received from the ACK/NACK generator 214, and outputs the modulated response signal to the primary spreader 216.

The primary spreader 216 performs primary spreading on the reference signal and the response signal received from the modulator 215 by using the ZAC sequence defined by the cyclic shift index set by the controller 213. The primary spreader 216 then outputs the response signal and the reference signal subjected to primary spreading to the secondary spreader 217.

The secondary spreader 217 performs secondary spreading on the response signal and the reference signal by using the intra-subframe orthogonal sequence set by the controller 213, and outputs the response signal and the reference signal subjected to secondary spreading to the IFFT unit 218.

The IFFT unit 218 maps the response signal and the reference signal received from the secondary spreader 217 onto subcarriers by using the frequency resources set by the controller 213, and performs IFFT processing on the response signal and the reference signal so as to generate a time domain signal. The IFFT unit 218 outputs the generated signal to the CP adder 219.

The CP adder 219 adds CPs to the signal received from the IFFT unit 218, and outputs the resulting signal to the transmitter 220.

The transmitter 220 performs RF processing, such as D/A conversion and up-conversion, on the signal received from the CP adder 219, and transmits the wireless signal to the base station 100 via the antenna 201.

[Setting of PUCCH Resources]

Setting of PUCCH resources used in the base station 100 and the terminals 200 configured as described above will be described below in detail.

In PUCCH resources (cyclic shift indexes, intra-subframe orthogonal sequences, and inter-subframe orthogonal sequences) used in the base station 100 and the terminals 200 according to the first embodiment, one resource is constituted by one cyclic shift index and one intra-subframe orthogonal sequence (OC index), and plural resources are associated with each of the plural inter-subframe orthogonal sequences.

Resources (resources defined by cyclic shift indexes and intra-subframe orthogonal sequences) associated with plural inter-subframe orthogonal sequences are different. That is, resources associated with one inter-subframe orthogonal sequence are different from those associated with another inter-subframe orthogonal sequence, and the same resource is not associated with different inter-subframe orthogonal sequences.

Figure 9:
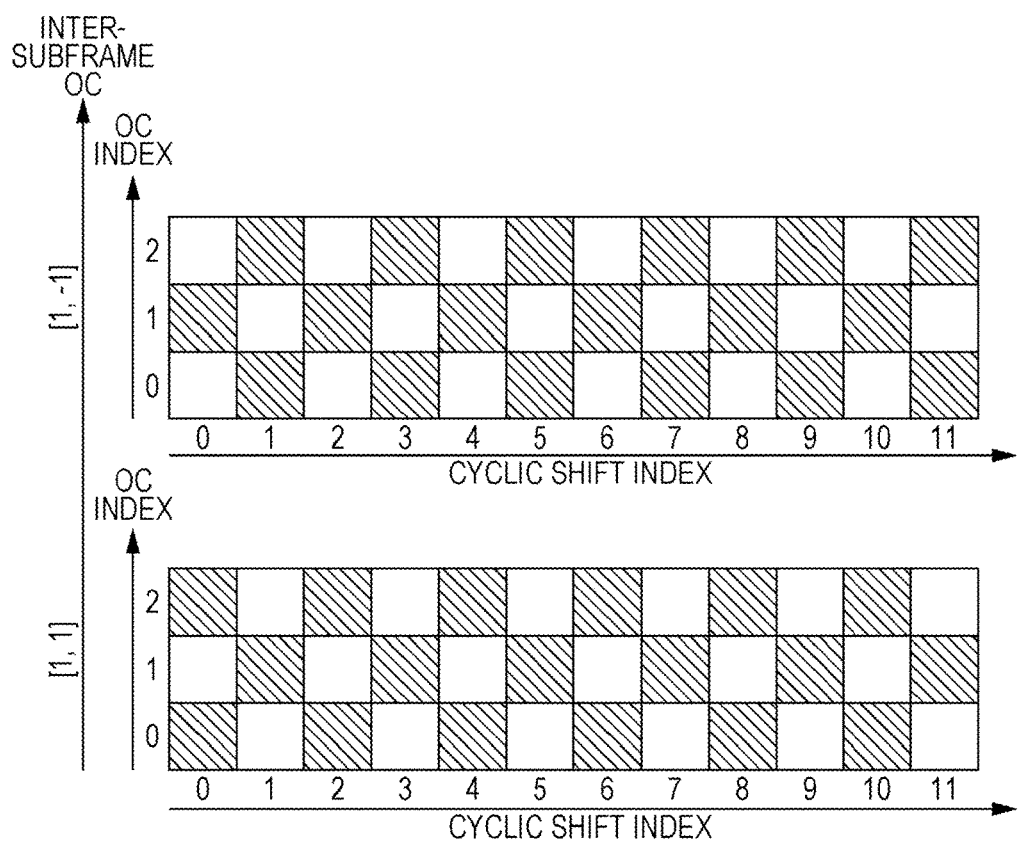
FIG. 9 illustrates a setting example of PUCCH resources when $N_{SF}=2$ according to the first embodiment.
Figure 10:
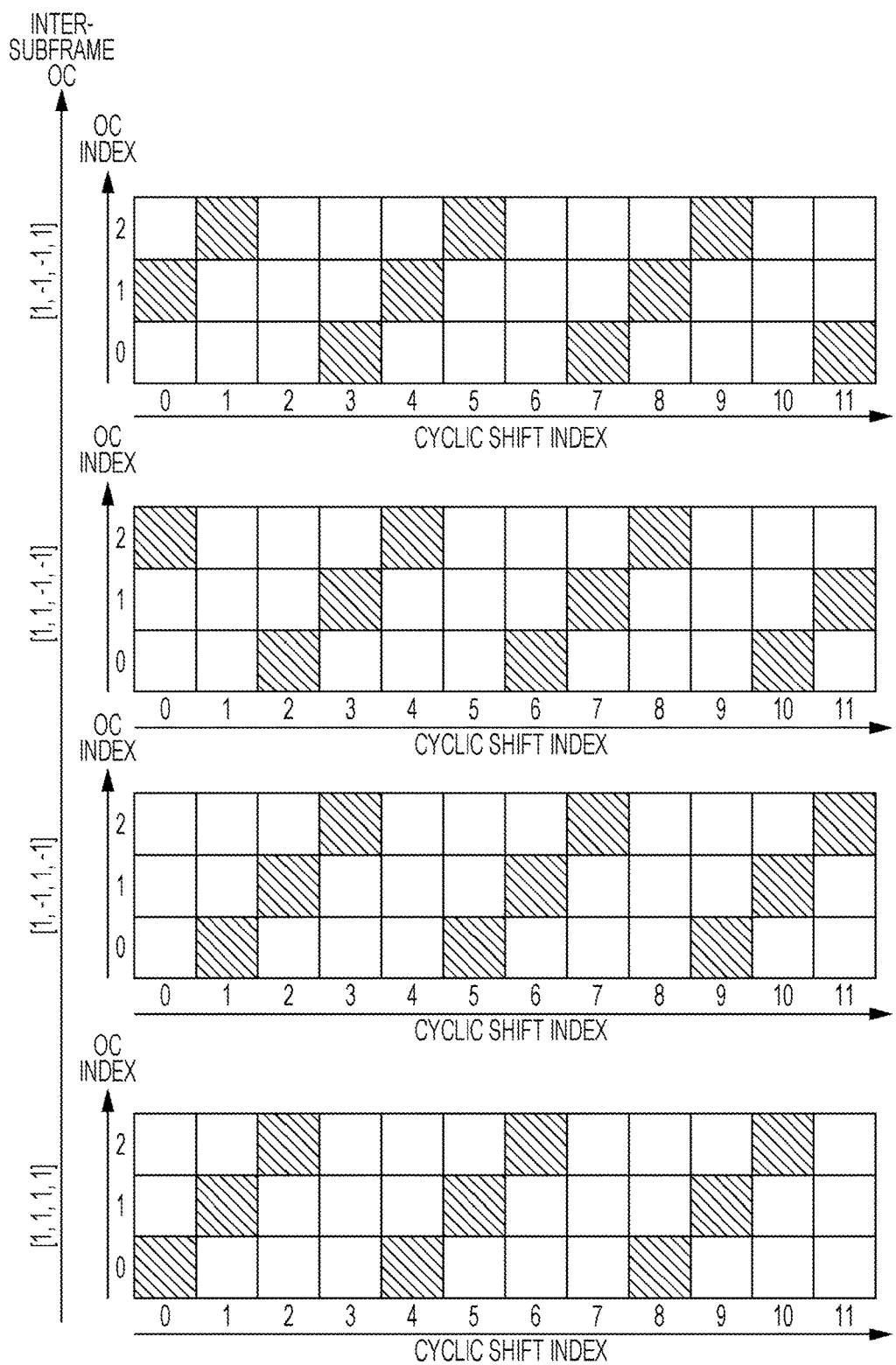
FIG. 10 illustrates a setting example of PUCCH resources when $N_{SF}=4$ according to the first embodiment.

FIGS. 9 and 10 illustrate setting examples of PUCCH resources in the first embodiment. FIG. 9 illustrates a setting example in which the sequence length of inter-subframe orthogonal sequences is 2 ($N_{SF}=2$), while FIG. 10 illustrates a setting example in which the sequence length of inter-subframe orthogonal sequences is 4 ($N_{SF}=4$).

For example, the resources associated with the inter-subframe orthogonal sequence (1,1) shown in FIG. 9 (regions indicated by the hatched portions, and the other drawings are also illustrated in a similar manner) are resources constituted by intra-subframe orthogonal sequences of the sequence numbers (OC indexes) 0 and 2 and cyclic shift indexes of 0, 2, 4, 6, 8, and 10 and resources constituted by an intra-subframe orthogonal sequence of the sequence number (OC index) 1 and cyclic shift indexes of 1, 3, 5, 7, 9, and 11.

The resources associated with the inter-subframe orthogonal sequence (1,−1) shown in FIG. 9 are resources constituted by intra-subframe orthogonal sequences of the sequence numbers (OC indexes) 0 and 2 and cyclic shift indexes of 1, 3, 5, 7, 9, and 11 and resources constituted by an intra-subframe orthogonal sequence of the sequence number (OC index) 1 and cyclic shift indexes of 0, 2, 4, 6, 8, and 10.

That is, the resources (combinations of cyclic shift indexes and intra-subframe orthogonal sequences) associated with the inter-subframe orthogonal sequence (1,1) shown in FIG. 9 are different from those associated with the inter-subframe orthogonal sequence (1,−1). In other words, the resources associated with the inter-subframe orthogonal sequence (1,1) do not overlap the resources associated with the inter-subframe orthogonal sequence (1,−1).

Similarly, the resources associated with the inter-subframe orthogonal sequence (1,1,1,1) shown in FIG. 10 are resources constituted by the intra-subframe orthogonal sequence of the sequence number (OC index) 0 and cyclic shift indexes of 0, 4, and 8, resources constituted by the intra-subframe orthogonal sequence of the sequence number (OC index) 1 and cyclic shift indexes of 1, 5, and 9, and resources constituted by the intra-subframe orthogonal sequence of the sequence number (OC index) 2 and cyclic shift indexes of 2, 6, and 10.

Resources generated by cyclically shifting the resources associated with the inter-subframe orthogonal sequence (1,1,1,1) by one, two, and three in the direction of the cyclic shift indexes are associated with the other inter-subframe orthogonal sequences (1,−1,1,−1), (1,1,−1,−1), (1,−1,−1,1), respectively. In other words, the cyclic shift indexes associated with the four inter-subframe orthogonal sequences have a predetermined gap or difference (one in FIG. 10).

That is, as in the resources in FIG. 9, the resources (combinations of cyclic shift indexes and intra-subframe orthogonal sequences) associated with the four inter-subframe orthogonal sequences shown in FIG. 10 are different from each other. In other words, the resources associated with the four inter-subframe orthogonal sequences do not overlap each other.

The base station 100 allocates PUCCH resources to the terminals 200 in which the MTC coverage enhancement mode is set, based on the setting of PUCCH resources shown in FIG. 9 or 10. The terminals 200 transmit response signals by using the PUCCH resources allocated by the base station 100.

As shown in FIGS. 9 and 10, the resources associated with plural inter-subframe orthogonal sequences are different from each other. With this configuration, terminals 200 to which PUCCH resources including different inter-subframe orthogonal sequences are allocated do not use the same resource (the same combination of cyclic shift indexes and intra-subframe orthogonal sequences).

Even if the orthogonality of inter-subframe orthogonal sequences is destroyed during the time for which response signals are transmitted from terminals 200 to which different inter-subframe orthogonal sequences are allocated (that is, during the repetition transmission period), it is more likely that the orthogonality of PUCCH resources between the terminals 200 will be maintained due to the use of different resources (intra-subframe orthogonal sequences and cyclic shift indexes). Thus, according to the setting of PUCCH resources in the first embodiment, it is possible to reduce the influence of inter-code interference caused by the destruction of the orthogonality between inter-subframe orthogonal sequences.

That is, in the base station 100 and the terminal 200, even in a situation where the inter-code interference due to the destruction of the orthogonality between inter-subframe orthogonal sequences may occur, it is possible to reduce the influence of inter-code interference because of the effect of spreading and despreading by using cyclic shift indexes and intra-subframe orthogonal sequences.

As described above, in the first embodiment, the setting of PUCCH resources is determined so that the occurrence of inter-code interference caused by the destruction of the orthogonality between inter-subframe orthogonal sequences will be reduced. It is thus possible to suppress the transmission performance degradation which would be caused by the inter-code interference in the MTC coverage enhancement mode.

Modified Example of First Embodiment

If the sequence length of inter-subframe orthogonal sequences is four or greater, resources (cyclic shift indexes and intra-subframe orthogonal sequences) may be associated with inter-subframe orthogonal sequences in accordance with whether or not the orthogonality is maintained in subsequences between inter-subframe orthogonal sequences (that is, in accordance with the magnitude of inter-code interference).

More specifically, among resources constituted by the same intra-subframe orthogonal sequence, resources constituted by adjacent cyclic shift indexes (having a difference of one) are associated with inter-subframe orthogonal sequences in which subsequences are orthogonal to each other (hereinafter such inter-subframe orthogonal sequences will also be referred to as "inter-subframe orthogonal sequences partially orthogonal to each other").

Figure 11:
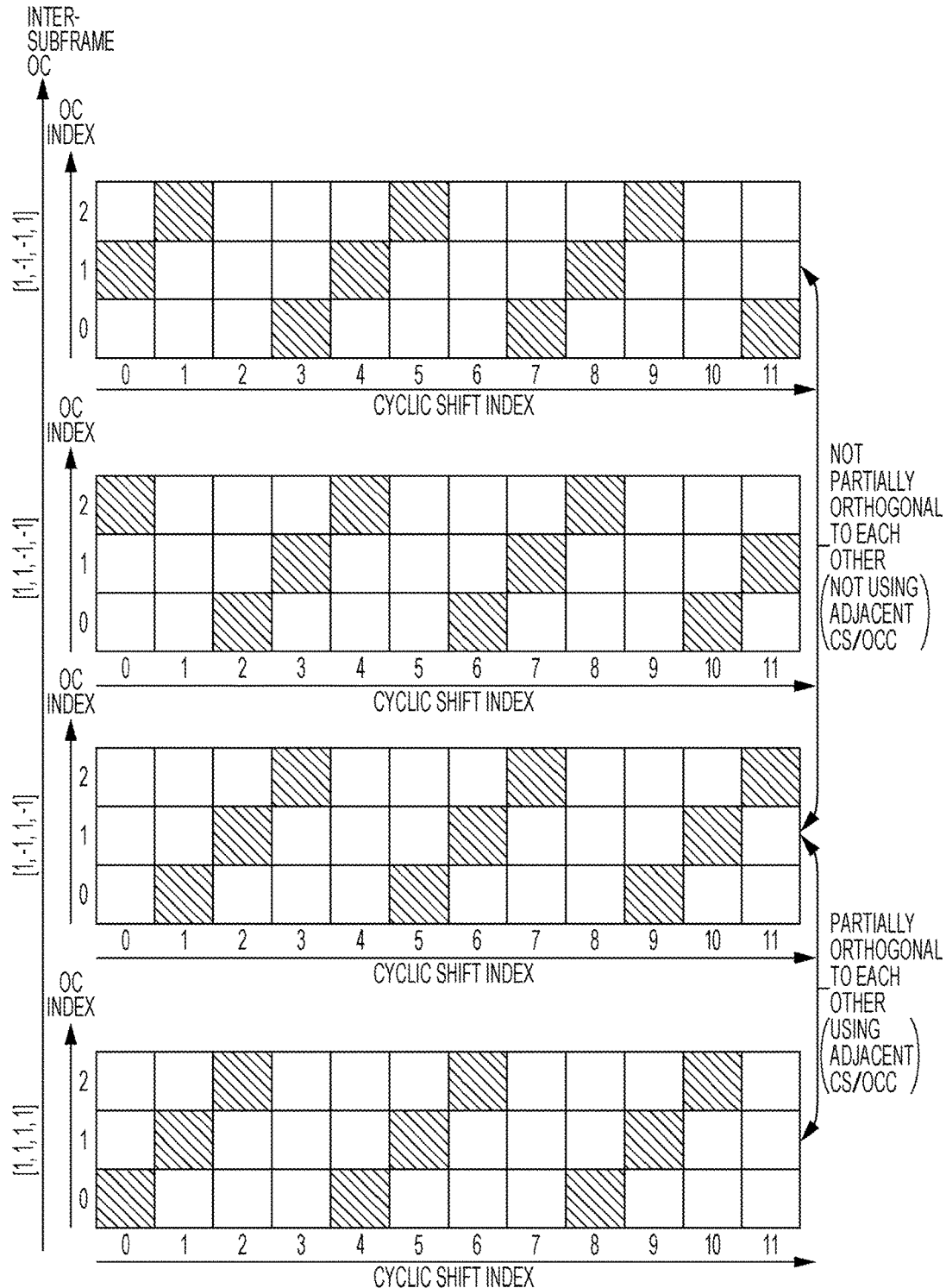
FIG. 11 illustrates a setting example of PUCCH resources according to a modified example of the first embodiment.

FIG. 11 illustrates a setting example of PUCCH resources in this modified example. The inter-subframe orthogonal sequence (1,1,1,1) shown in FIG. 11 will now be focused. The subsequence (1,1) of the first two codes of the inter-subframe orthogonal sequence (1,1,1,1) is orthogonal to the subsequence (1,−1) of the first two codes of the inter-subframe orthogonal sequence (1,−1,1,−1) and the subsequence (1,−1) of the first two codes of the inter-subframe orthogonal sequence (1,−1,−1,1). The subsequence (1,1) of the second two codes of the inter-subframe orthogonal sequence (1,1,1,1) is orthogonal to the subsequence (1,−1) of the second two codes of the inter-subframe orthogonal sequence (1,−1,1,−1) and the subsequence (−1,1) of the second two codes of the inter-subframe orthogonal sequence (1,−1,−1,1). That is, the inter-subframe orthogonal sequence (1,1,1,1) is partially orthogonal to the inter-subframe orthogonal sequence (1,−1,1,−1) and the inter-subframe orthogonal sequence (1,−1,−1,1). The cyclic shift indexes of the resources associated with the inter-subframe orthogonal sequence (1,−1,1,−1) are different from those of the resources associated with the inter-subframe orthogonal sequence (1,1,1,1) by +1. The cyclic shift indexes of the resources associated with the inter-subframe orthogonal sequence (1,−1,−1,1) are different from those of the resources associated with the inter-subframe orthogonal sequence (1,1,1,1) by −1. That is, among the resources constituted by the same intra-subframe orthogonal sequence, resources constituted by adjacent cyclic shift indexes (having a difference of one) are associated with the inter-subframe orthogonal sequence (1,1,1,1) and the inter-subframe orthogonal sequence (1,−1,1,−1) or the inter-subframe orthogonal sequence (1,−1,−1,1) which are partially orthogonal to each other. On the other hand, the cyclic shift indexes of the resources associated with the inter-subframe orthogonal sequence (1,1,−1,−1), which is not partially orthogonal to the inter-subframe orthogonal sequence (1,1,1,1), are different from those of the resources associated with the inter-subframe orthogonal sequence (1,1,1,1) by +2.

That is, among plural inter-subframe orthogonal sequences, the difference between the cyclic shift indexes (In FIG. 11, one) used for the same intra-subframe orthogonal sequence (the same OC index) and associated with a pair of inter-subframe orthogonal sequences which are partially orthogonal to each other (in FIG. 11, (1,1,1,1) and (1,−1,1,−1) or (1,1,1,1) and (1,−1,−1,1)) is smaller than the difference between the cyclic shift indexes (In FIG. 11, two) used for the same intra-subframe orthogonal sequence (the same OC index) and associated with a pair of inter-subframe orthogonal sequences which are not partially orthogonal to each other (in FIG. 11, (1,1,1,1) and (1,1,−1,−1)). This may be considered in a similar manner when another inter-subframe orthogonal sequence is focused.

Between inter-subframe orthogonal sequences partially orthogonal to each other, among four subframes corresponding to the sequence length, subsequences of the first two subframes (subsequences of the first two codes) of one inter-subframe orthogonal sequence are orthogonal to those of the other inter-subframe orthogonal sequence, while subsequences of the second two subframes (subsequences of the second two codes) of one inter-subframe orthogonal sequence are also orthogonal to those of the other inter-subframe orthogonal sequence. This makes it possible for the base station 100 to divide four subframes into the first two subframes and the second two subframes and to separate plural response signals in each of the first two subframes and the second two subframes from each other subjected to code-multiplexing by inter-subframe orthogonal sequences. Accordingly, it is less likely that the orthogonality between inter-subframe orthogonal sequences partially orthogonal to each other will be destroyed, compared with inter-subframe orthogonal sequences which are not partially orthogonal to each other. It is thus possible to reduce the inter-code interference between the inter-subframe orthogonal sequences partially orthogonal to each other.

The inter-code interference caused by the destruction of the orthogonality is more likely to occur between resources constituted by adjacent cyclic shift indexes among resources constituted by the same intra-subframe orthogonal sequence. However, since inter-subframe orthogonal sequences associated with these resources are partially orthogonal to each other, the transmission performance degradation caused by the inter-code interference can be suppressed.

On the other hand, the inter-code interference caused by the destruction of the orthogonality is less likely to occur between resources constituted by separated cyclic shift indexes (for example, the difference is two or greater) among resources constituted by the same intra-subframe orthogonal sequence. Accordingly, although the inter-code interference caused by the destruction of the orthogonality is more likely to occur between inter-subframe orthogonal sequences which are not partially orthogonal to each other, the inter-code interference is less likely to occur between the above-described resources associated with these inter-subframe orthogonal sequences. As a result, the inter-code interference in the overall PUCCH resources can be suppressed.

Second Embodiment

In the first embodiment (FIG. 9 and FIG. 10 or 11), among the resources associated with one inter-subframe orthogonal sequence, the amount of (minimum) difference between the cyclic shift indexes used for the same intra-subframe orthogonal sequence is the same as the sequence length of the inter-subframe orthogonal sequence. For example, when the sequence length of the inter-subframe orthogonal sequence is two (FIG. 9), the (minimum) difference between the cyclic shift indexes used for the same intra-subframe orthogonal sequence is 2. When the sequence length of the inter-subframe orthogonal sequence is 4 (FIG. 10 or 11), the (minimum) difference between the cyclic shift indexes used for the same intra-subframe orthogonal sequence is 4. In this case, the number of usable PUCCH resources is restricted according to the sequence length of the inter-subframe orthogonal sequence.

Accordingly, in a second embodiment, while the inter-code interference in PUCCH resources is being reduced, the number of usable PUCCH resources is increased so as to increase the number of codes to be multiplexed.

The basic configurations of a base station and a terminal according to the second embodiment are the same as those of the base station 100 and the terminal 200 of the first embodiment, and thus, a description will be given below by using FIGS. 7 and 8.

Among PUCCH resources (cyclic shift indexes, intra-subframe orthogonal sequences, and inter-subframe orthogonal sequences) used by the base station 100 and the terminals 200 in the second embodiment, plural resources, each being constituted by one cyclic shift index and one intra-subframe orthogonal sequence (OC index), are associated with each inter-subframe orthogonal sequence, as in the first embodiment.

In the second embodiment, among plural inter-subframe orthogonal sequences, different resources are associated with at least one pair of inter-subframe orthogonal sequences which are not partially orthogonal to each other, while the same resources are associated with at least one pair of inter-subframe orthogonal sequences which are partially orthogonal to each other. In other words, the setting of PUCCH resources is determined so that the same resources will not be associated with inter-subframe orthogonal sequences which are not partially orthogonal to each other and so that the same resources may be associated with inter-subframe orthogonal sequences which are partially orthogonal to each other.

Figure 12:
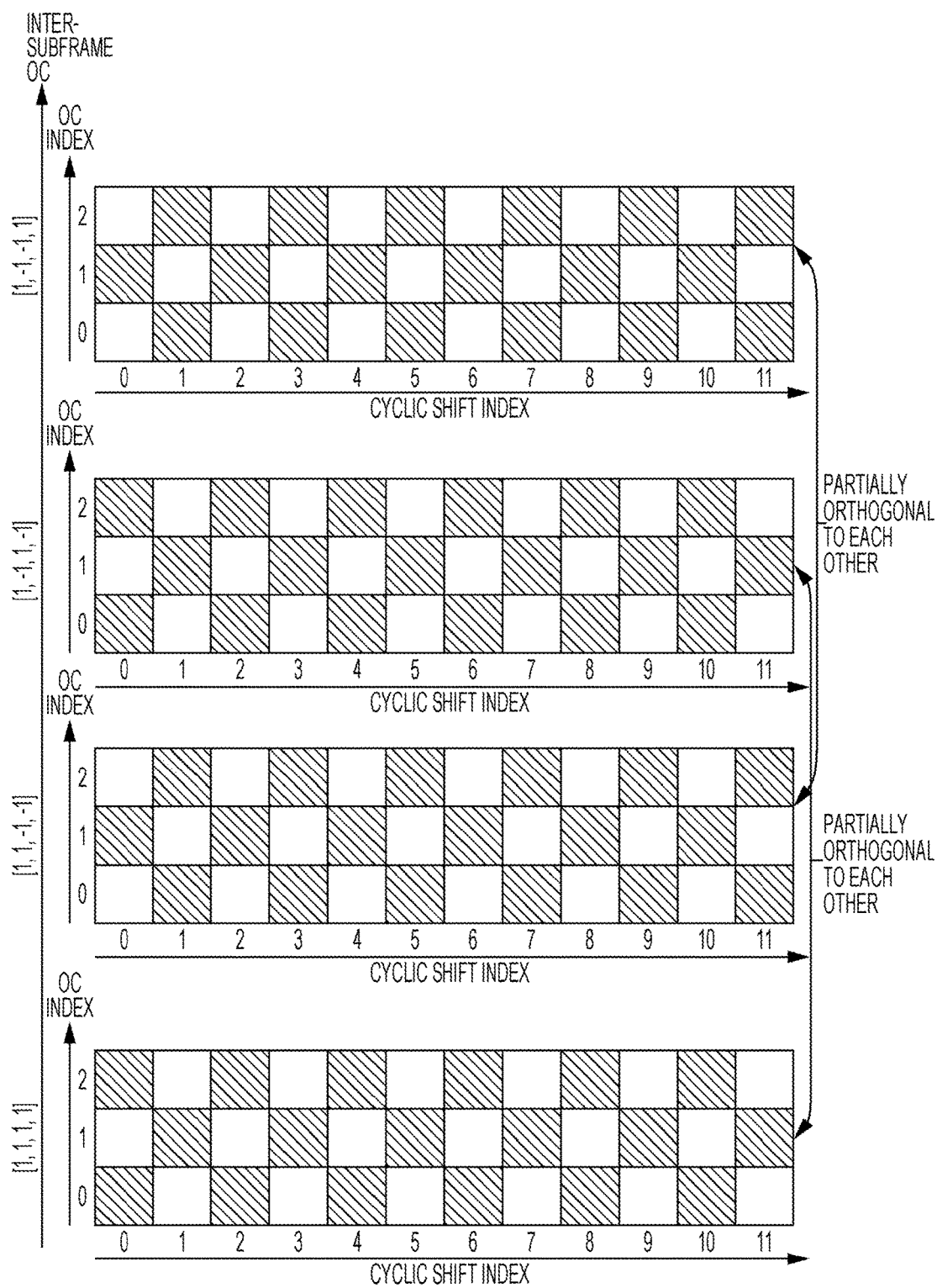
FIG. 12 illustrates a setting example of PUCCH resources according to a second embodiment.

FIG. 12 illustrates a setting example of PUCCH resources in the second embodiment. In FIG. 12, a setting example in which the sequence length of inter-subframe orthogonal sequences is 4 ($N_{SF}=4$) is shown.

For example, among the plural inter-subframe orthogonal sequences shown in FIG. 12, the resources constituted by the intra-subframe orthogonal sequence of the OC indexes 0 and 2 and cyclic shift indexes of 0, 2, 4, 6, 8, and 10 and the resources constituted by the intra-subframe orthogonal sequence of the OC index 1 and cyclic shift indexes of 1, 3, 5, 7, 9, and 11 are associated with the inter-subframe orthogonal sequences (1,1,1,1) and (1,−1,1,−1) which are partially orthogonal to each other.

Among the plural inter-subframe orthogonal sequences shown in FIG. 12, the resources constituted by the intra-subframe orthogonal sequence of the OC indexes 0 and 2 and cyclic shift indexes of 1, 3, 5, 7, 9, and 11 and the resources constituted by the intra-subframe orthogonal sequence of the OC index 1 and cyclic shift indexes of 0, 2, 4, 6, 8, and 10 are associated with the inter-subframe orthogonal sequences (1,1,−1,−1) and (1,−1,−1,1) which are partially orthogonal to each other.

That is, as shown in FIG. 12, the same resources (cyclic shift indexes and intra-subframe orthogonal sequences) are associated with the pair of inter-subframe orthogonal sequences (1,1,1,1) and (1,−1,1,−1) partially orthogonal to each other, while the same resources are associated with the pair of inter-subframe orthogonal sequences (1,1,−1,−1) and (1,−1,−1,1) partially orthogonal to each other. On the other hand, as shown in FIG. 12, different resources are associated with the pair of inter-subframe orthogonal sequences (1,1,1,1) and (1,1,−1,−1) which are not partially orthogonal to each other, while different resources are associated with the pair of inter-subframe orthogonal sequences (1,−1,1,−1) and (1,−1,−1,1) which are not partially orthogonal to each other.

The base station 100 allocates PUCCH resources to the terminals 200 in which the MTC coverage enhancement mode is set, based on the setting of PUCCH resources shown in FIG. 12. The terminals 200 transmit response signals by using the PUCCH resources allocated by the base station 100.

The inter-code interference caused by the destruction of the orthogonality is more likely to occur between terminals 200 to which inter-subframe orthogonal sequences which are not partially orthogonal to each other are allocated, as shown in FIG. 12. However, since different resources (combinations of cyclic shift indexes and intra-subframe orthogonal sequences) are associated with inter-subframe orthogonal sequences which are not partially orthogonal to each other, it is possible to suppress the inter-code interference caused by the destruction of the orthogonality.

That is, in the base station 100 and the terminal 200, although the inter-code interference due to the destruction of the orthogonality is more likely to occur between inter-subframe orthogonal sequences which are not partially orthogonal to each other, it is still possible to reduce the inter-code interference because of the effect of spreading and despreading by using cyclic shift indexes and intra-subframe orthogonal sequences.

As in the modified example of the first embodiment, between inter-subframe orthogonal sequences partially orthogonal to each other, subsequences of the first two subframes (subsequences of the first two codes) of one inter-subframe orthogonal sequence are orthogonal to those of the inter-subframe orthogonal sequence, while subsequences of the second two subframes (subsequences of the second two codes) of one inter-subframe orthogonal sequence are also orthogonal to those of the other inter-subframe orthogonal sequence. This makes it possible for the base station 100 to divide four subframes into the first two subframes and the second two subframes and to separate plural response signals in each of the first two subframes and the second two subframes from each other subjected to code-multiplexing by inter-subframe orthogonal sequences. Accordingly, it is less likely that the orthogonality between inter-subframe orthogonal sequences which are partially orthogonal to each other will be destroyed, compared with inter-subframe orthogonal sequences which are not partially orthogonal to each other. It is thus possible to reduce the inter-code interference between the inter-subframe orthogonal sequences partially orthogonal to each other.

Thus, in terminals 200 to which inter-subframe orthogonal sequences partially orthogonal to each other are allocated, even though the same resources (combinations of cyclic shift indexes and intra-subframe orthogonal sequences) are associated with inter-subframe orthogonal sequences partially orthogonal to each other, as shown in FIG. 12, the inter-code interference in the overall PUCCH resources can be suppressed.

As shown in FIG. 12, by associating the same resources with different inter-subframe orthogonal sequences, the number of usable PUCCH resources in each inter-subframe orthogonal sequence can be increased, compared with the first embodiment (FIG. 10) and the modified example thereof (FIG. 11). More specifically, among the resources associated with each inter-subframe orthogonal sequence, the amount of (minimum) difference between the cyclic shift indexes used for the same intra-subframe orthogonal sequence is smaller than the sequence length of the inter-subframe orthogonal sequence. For example, in FIG. 12, while the sequence length of the inter-subframe orthogonal sequence is 4, the (minimum) difference between the cyclic shift indexes used for the same intra-subframe orthogonal sequence in each inter-subframe orthogonal sequence is 2. That is, in the second embodiment, the number of usable PUCCH resources is twice as many as that in the first embodiment (FIG. 10).

That is, in the base station 100 and the terminals 200, the same resources (the same cyclic shift indexes and the same intra-subframe orthogonal sequences) are associated with inter-subframe orthogonal sequences partially orthogonal to each other where the inter-code interference caused by the destruction of the orthogonality is less likely to occur. Accordingly, the number of PUCCH resources can be increased while reducing the inter-code interference. That is, the overhead of PUCCH resources can be reduced.

As described above, compared with the first embodiment, in the second embodiment, the number of usable PUCCH resources can be increased. It is also possible to reduce the transmission performance degradation caused by the inter-code interference in the MTC coverage enhancement mode.

Third Embodiment

In a third embodiment, when a terminal in the MTC coverage enhancement mode performs repetition transmission for a PUCCH signal, it starts repetition transmission in a predetermined X cycle and the repetition number ($N_{Rep}$) is an integer multiple of X (see, for example, R1-140501, Panasonic, "(E)PDCCH coverage enhancement for MTC, 3GPP TSG RAN WG1 Meeting #76, February 2014). For example, X is a cell-specific subframe length (common subframe length) or the number of subframes.

In the third embodiment, the sequence length (spreading factor) of an inter-subframe orthogonal sequence is a predetermined value. For example, the sequence length (spreading factor) of an inter-subframe orthogonal sequence is set to be the cell-specific subframe length (common subframe length) and is the same as X.

Figure 13:
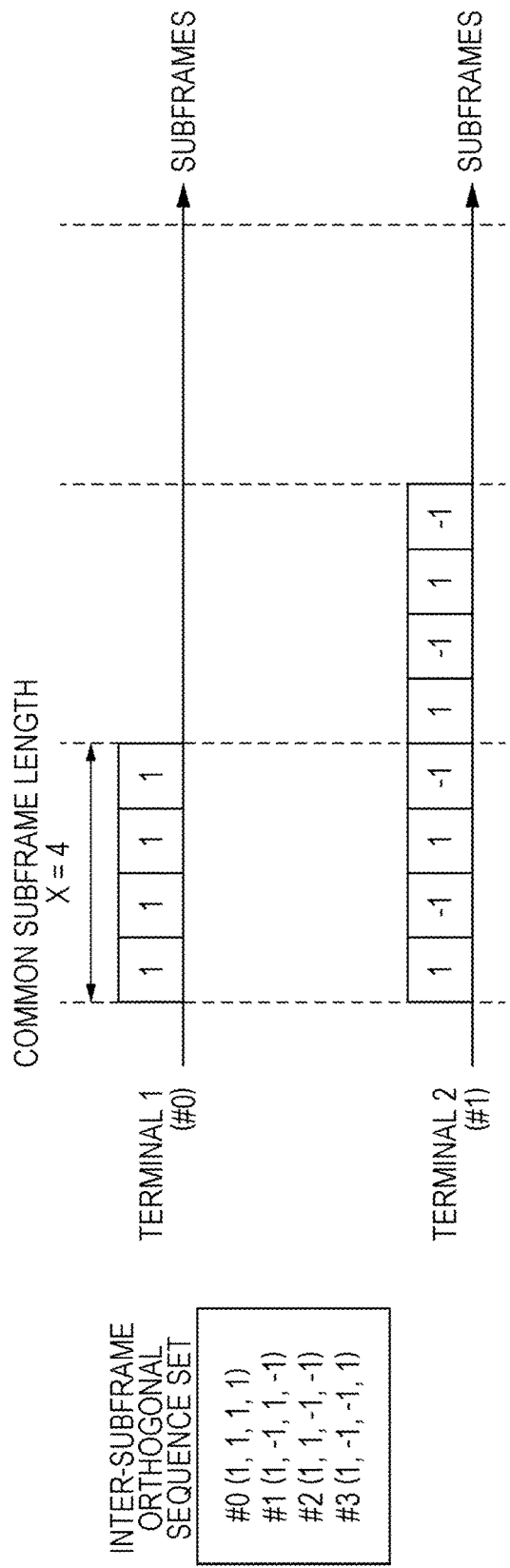
FIG. 13 illustrates an example of PUCCH repetition transmission.

FIG. 13 illustrates an example in which X is set to be the same as the common subframe length, that is, 4, and the sequence length (spreading factor) $N_{SF}$ of an inter-subframe orthogonal sequence is set to be the common subframe length (that is, $N_{SF}=X=4$). In the example of FIG. 13, the repetition number of terminal 1 is $N_{REF}^{(1)}=4$, while the repetition number of terminal 2 is $N_{REF}^{(2)}=8$, and also, (1,1,1,1), (1,−1,1,−1), (1,1,−1,−1), and (1,−1,−1,1) are set in advance as a set of inter-subframe orthogonal sequences.

Regardless of the repetition number of a terminal, one of inter-subframe orthogonal sequences in the set is allocated to each terminal. In FIG. 13, the sequence (1,1,1,1) of index #0 of one set of inter-subframe orthogonal sequences is allocated to the terminal 1, while the sequence (1,−1,1,−1) of index #1 of the same set of inter-subframe orthogonal sequences is allocated to the terminal 2. As shown in FIG. 13, the inter-subframe orthogonal sequence (1,−1,1,−1) is repeatedly allocated twice to the terminal 2 in which the repetition number of terminal 2 is $N_{REF}^{(2)}=8$.

In this manner, even in a case in which the repetition number is different between terminals and in which subframes where PUCCH repetition transmission is performed in one terminal overlap those in another terminal, the orthogonality among PUCCH resources can be maintained by using inter-subframe orthogonal sequences having the common subframe length.

However, if the repetition number is different between terminals, there may be a difference between the terminals in the signal power per unit time (for example, signal power per common subframe length) received by the base station. This is because the base station satisfies the overall required quality by receiving signals for the number of repetition times set in each terminal. Generally, the signal power per unit time received by the base station from a terminal having a smaller repetition number is greater than that from a terminal having a larger repetition number. In FIG. 13, for example, the received signal power per common subframe length from the terminal 1 having the repetition number 4 is larger than that from the terminal 2 having the repetition number 8.

Accordingly, if subframes in which PUCCH repetition transmission is performed in one terminal overlap those in another terminal, there may be a difference in the received signal power in the overlapping subframes between the terminals. If there is a large difference in the received signal power in the overlapping subframes, a received signal of higher power causes the inter-code interference for a received signal of lower power so as to cause the transmission performance degradation. In FIG. 13, for example, a signal from the terminal 1 causes the inter-code interference for a signal from the terminal 2.

In the third embodiment, therefore, the setting of PUCCH resources is determined so that terminals 200 having different repetition numbers will not use the same resources (cyclic shift indexes and the intra-subframe orthogonal sequences) at the same time.

The basic configurations of a base station and a terminal according to the third embodiment are the same as those of the base station 100 and the terminal 200 of the first embodiment, and thus, a description will be given below by using FIGS. 7 and 8.

Figure 14:
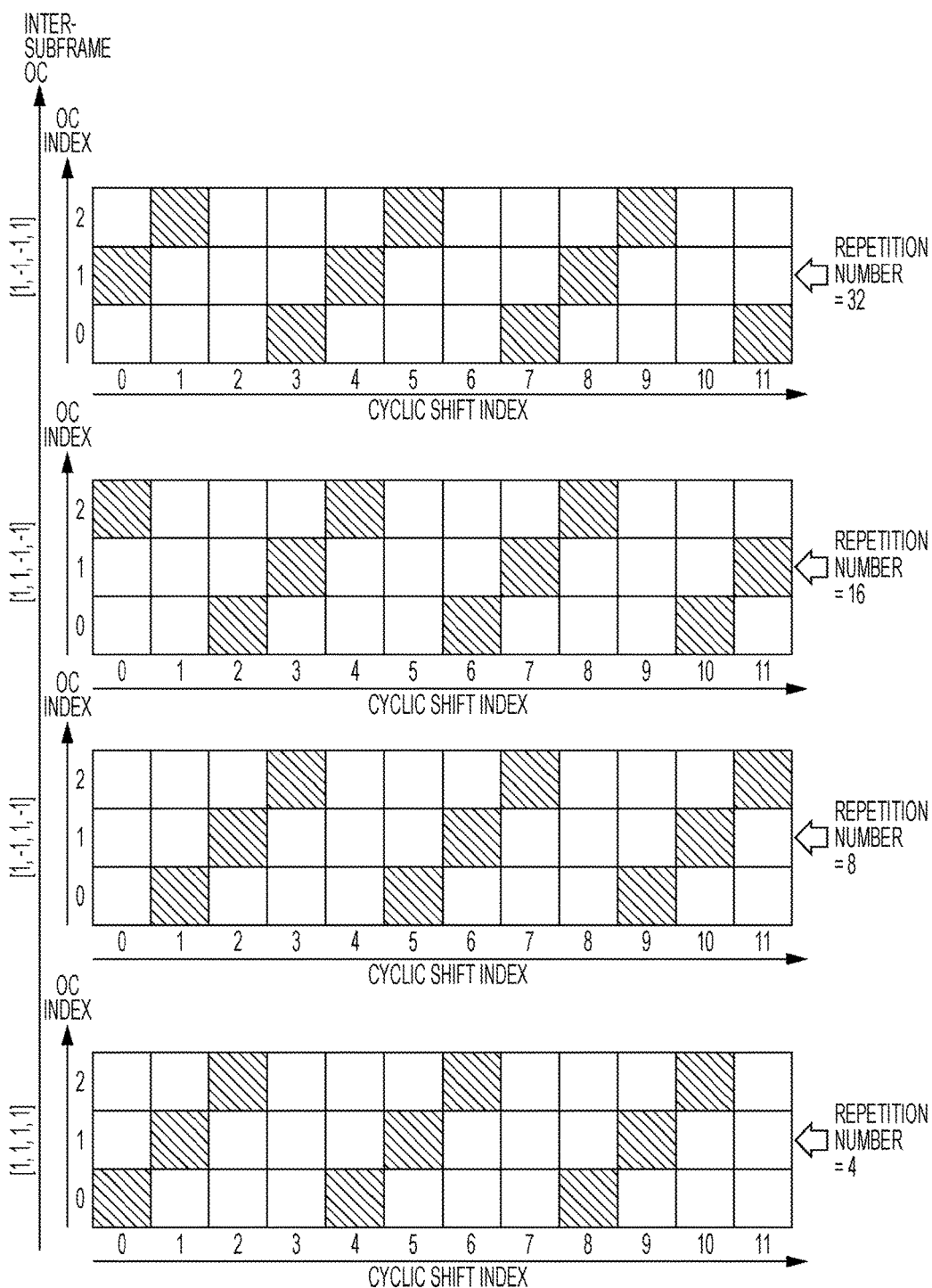
FIG. 14 illustrates a setting example of PUCCH resources according to a third embodiment.

FIG. 14 illustrates a setting example of PUCCH resources in the third embodiment. In FIG. 14, a setting example in which the sequence length of inter-subframe orthogonal sequences is 4 ($N_{SF}=4$) is shown.

As in the first embodiment, in PUCCH resources used in the base station 100 and the terminals 200 of the third embodiment, plural resources, each being constituted by one cyclic shift index and one intra-subframe orthogonal sequence (OC index), are associated with each of the plural inter-subframe orthogonal sequences, as shown in FIG. 14. In the third embodiment, as well as in the first embodiment (FIG. 10) and the modified example thereof (FIG. 11), different resources are associated with the inter-subframe orthogonal sequences.

In the third embodiment, as shown in FIG. 14, different repetition numbers are associated with the plural inter-subframe orthogonal sequences. That is, different inter-subframe orthogonal sequences are associated with terminals 200 having different repetition numbers.

In FIG. 14, for example, the repetition number associated with the inter-subframe orthogonal sequence (1,1,1,1) is 4, the repetition number associated with the inter-subframe orthogonal sequence (1,−1,1,−1) is 8, the repetition number associated with the inter-subframe orthogonal sequence (1,1,−1,−1) is 16, and the repetition number associated with the inter-subframe orthogonal sequence (1,−1,−1,1) is 32.

The base station 100 allocates PUCCH resources including different inter-subframe orthogonal sequences to terminals 200 having different repetition numbers, based on the setting of PUCCH resources shown in FIG. 14. The terminals 200 transmit response signals by using the PUCCH resources allocated by the base station 100.

As shown in FIG. 14, since different resources are associated with the different inter-subframe orthogonal sequences, signals from the terminals 200 having different repetition numbers are not multiplexed by the same inter-subframe orthogonal sequences or the same resources (cyclic shift indexes and intra-subframe orthogonal sequences). That is, response signals from the terminals 200 having different repetition numbers are multiplexed by different inter-subframe orthogonal sequences and different resources.

Accordingly, in the third embodiment, even in a case in which subframes in which PUCCH repetition transmission is performed in one terminal 200 overlap those in another terminal 200 and in which there is a difference between the terminals 200 in the signal power received by the base station 100, it is possible to reduce inter-code interference because of the effect of spreading and despreading by using PUCCH resources constituted by different inter-subframe orthogonal sequences and different resources (different combinations of cyclic shift indexes and intra-subframe orthogonal sequences).

As described above, in the third embodiment, by considering the repetition number of a response signal to be subjected to code-multiplexing in the MTC coverage enhancement mode, the transmission performance degradation caused by the inter-code interference can be suppressed.

If the sequence length of inter-subframe orthogonal sequences is four or greater, as shown in FIG. 14, among resources constituted by the same intra-subframe orthogonal sequence, resources constituted by adjacent cyclic shift indexes (having a difference of one) may be associated with inter-subframe orthogonal sequences partially orthogonal to each other, as in the modified example (FIG. 11) of the first embodiment. That is, among plural inter-subframe orthogonal sequences, the difference between the cyclic shift indexes (in FIG. 14, one) used for the same intra-subframe orthogonal sequence and associated with a pair of inter-subframe orthogonal sequences which are partially orthogonal to each other is smaller than the difference between the cyclic shift indexes (in FIG. 14, two) used for the same intra-subframe orthogonal sequence and associated with a pair of inter-subframe orthogonal sequences which are not partially orthogonal to each other.

The repetition numbers may be associated with the inter-subframe orthogonal sequences so that the difference between the repetition numbers associated with inter-subframe orthogonal sequences partially orthogonal to each other with which resources constituted by adjacent cyclic shift indexes used for the same intra-subframe orthogonal sequence are associated will be smaller than that associated with inter-subframe orthogonal sequences which are not partially orthogonal to each other with which resources constituted by separated cyclic shift indexes (for example, the difference is two or greater) used for the same intra-subframe orthogonal sequence are associated.

That is, the difference between the repetition numbers associated with at least one pair of sequences partially orthogonal to each other among plural inter-subframe orthogonal sequences (sequences associated with resources constituted by cyclic shift indexes having a small difference and used for the same intra-subframe orthogonal sequence) is smaller than that associated with at least one pair of sequences which are not partially orthogonal to each other (sequences associated with resources constituted by cyclic shift indexes having a great difference and used for the same intra-subframe orthogonal sequence).

In FIG. 14, for example, the difference between the repetition numbers associated with the inter-subframe orthogonal sequences (1,1,1,1) and (1,1,−1,−1) which are not partially orthogonal to each other is 12, while the difference between the repetition numbers associated with the inter-subframe orthogonal sequences (1,1,1,1) and (1,−1,1,−1) which are partially orthogonal to each other is 4 (<12). Similarly, the difference between the repetition numbers associated with the inter-subframe orthogonal sequences (1,−1,−1,1) and (1,−1,1,−1) which are not partially orthogonal to each other is 24, while the difference between the repetition numbers associated with the inter-subframe orthogonal sequences (1,−1,−1,1) and (1, 1,−1,−1) which are partially orthogonal to each other is 16 (<24).

With this configuration, PUCCH resources constituted by adjacent cyclic shift indexes used for the same intra-subframe orthogonal sequence are allocated to terminals 200 having a small difference in the repetition number. As discussed above, the inter-code interference caused by the destruction of the orthogonality is more likely to occur between resources constituted by adjacent cyclic shift indexes used for the same intra-subframe orthogonal sequence. However, the inter-code interference between inter-subframe orthogonal sequences partially orthogonal to each other associated with these resources is small, and the inter-code interference between terminals 200 having a small difference in the repetition number (the difference in the received signal power is relatively small) is also small. As a result, the inter-code interference in the overall PUCCH resources can be suppressed.

The repetition numbers 4, 8, 16, and 32 are represented by $2^2$, $2^3$, $2^4$, and $2^5$, respectively, that is, $2^n$ (n is a natural number of two or greater). Accordingly, the difference in the repetition number may be considered as the difference in the value of n in $2^n$, that is, the difference in the exponent of a power representing the repetition number. In FIG. 14, for example, the difference between the repetition numbers (difference in the exponent) associated with the inter-subframe orthogonal sequence (1,1,1,1) (repetition number: $2^2$) and the inter-subframe orthogonal sequence (1,1,−1,−1) (repetition number: $2^4$) which are not partially orthogonal to each other is 2, while the difference between the repetition numbers (difference in the exponent) associated with the inter-subframe orthogonal sequence (1,1,1,1) (repetition number: $2^2$) and the inter-subframe orthogonal sequence (1,−1,1,−1) (repetition number: $2^3$) which are partially orthogonal to each other is 1 (<2).

Fourth Embodiment

In the third embodiment (FIG. 14), as well as in the first embodiment, among the resources associated with one inter-subframe orthogonal sequence, the amount of (minimum) difference between the cyclic shift indexes used for the same intra-subframe orthogonal sequence is the same as the sequence length of the inter-subframe orthogonal sequence. For example, in the third embodiment (FIG. 14), among the resources associated with each inter-subframe orthogonal sequence, the (minimum) difference between the cyclic shift indexes used for the same intra-subframe orthogonal sequence is 4. In this case, the number of usable PUCCH resources is restricted according to the sequence length of the inter-subframe orthogonal sequence.

Accordingly, in a fourth embodiment, by considering the repetition number of a response signal, while the inter-code interference in PUCCH resources is being reduced, the number of usable PUCCH resources is increased so as to increase the number of codes to be multiplexed.

The basic configurations of a base station and a terminal according to the fourth embodiment are the same as those of the base station 100 and the terminal 200 of the first embodiment, and thus, a description will be given below by using FIGS. 7 and 8.

Figure 15:
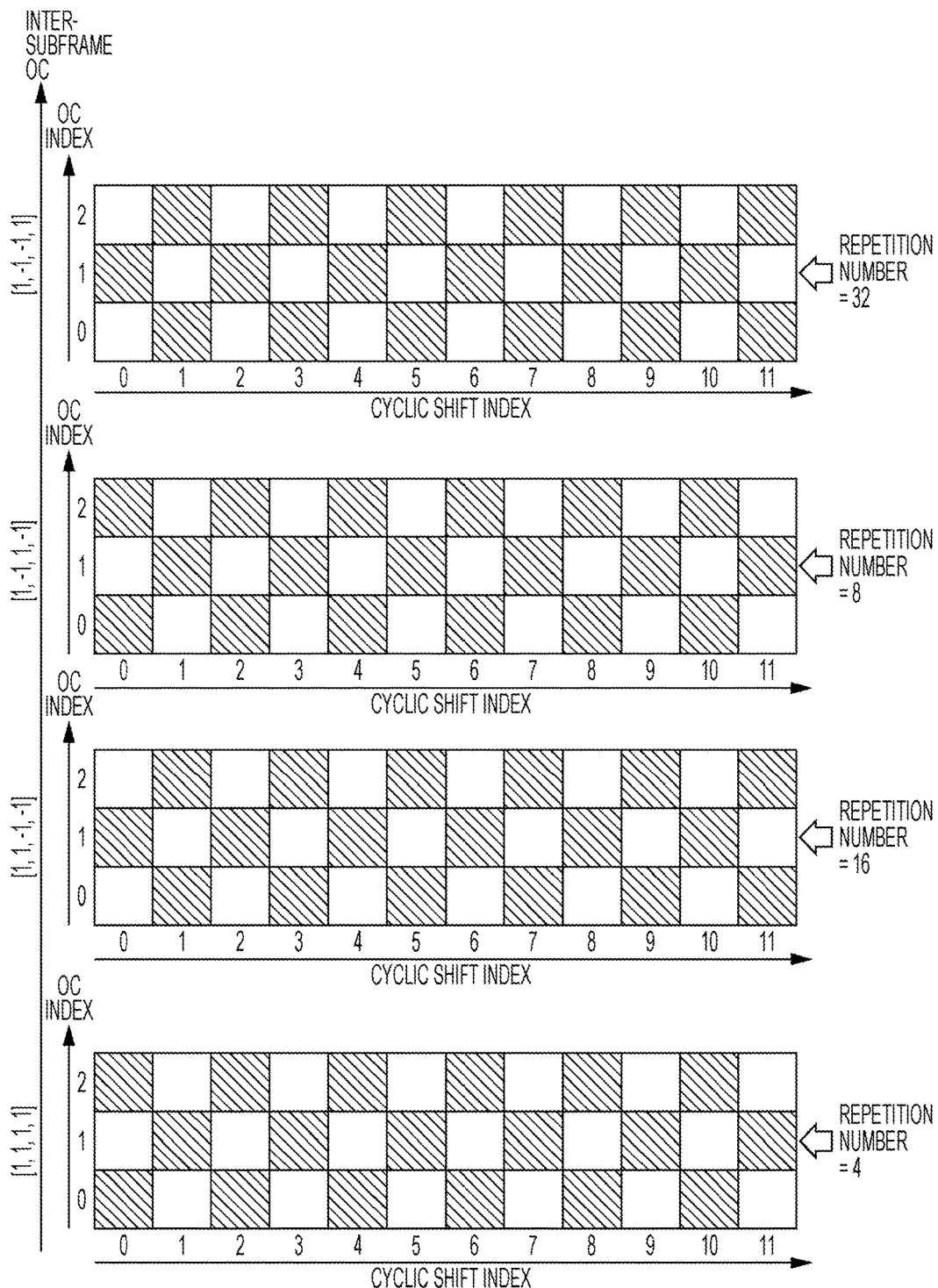
FIG. 15 illustrates a setting example of PUCCH resources according to a fourth embodiment.

FIG. 15 illustrates a setting example of PUCCH resources in the fourth embodiment. In FIG. 15, a setting example in which the sequence length of inter-subframe orthogonal sequences is 4 ($N_{SF}=4$) is shown.

Among PUCCH resources (cyclic shift indexes, intra-subframe orthogonal sequences, and inter-subframe orthogonal sequences) used by the base station 100 and the terminals 200 in the fourth embodiment, as shown in FIG. 15, plural resources, each being constituted by one cyclic shift index and one intra-subframe orthogonal sequence (OC index), are associated with each inter-subframe orthogonal sequence, as in the first embodiment.

In the fourth embodiment, as well as in the second embodiment, among plural inter-subframe orthogonal sequences, different resources are associated with at least one pair of inter-subframe orthogonal sequences which are not partially orthogonal to each other, while the same resources are associated with at least one pair of inter-subframe orthogonal sequences which are partially orthogonal to each other.

In the fourth embodiment, as well as in the third embodiment, different repetition numbers are associated with the plural inter-subframe orthogonal sequences. For example, in FIG. 15, the repetition number associated with the inter-subframe orthogonal sequence (1,1,1,1) is 4, the repetition number associated with the inter-subframe orthogonal sequence (1,1,−1,−1) is 16, the repetition number associated with the inter-subframe orthogonal sequence (1,−1,1,−1) is 8, and the repetition number associated with the inter-subframe orthogonal sequence (1,−1,−1,1) is 32.

In the fourth embodiment, the difference between the repetition numbers associated with at least one pair of inter-subframe orthogonal sequences partially orthogonal to each other with which the same resources (cyclic shift indexes and intra-subframe orthogonal sequences) are associated is smaller than that associated with at least one pair of inter-subframe orthogonal sequences which are not partially orthogonal to each other with which different resources are associated.

In FIG. 15, for example, the difference between the repetition numbers associated with the inter-subframe orthogonal sequences (1,1,1,1) and (1,1,−1,−1) which are not partially orthogonal to each other with which different resources are associated is 12, while the difference between the repetition numbers associated with the inter-subframe orthogonal sequences (1,1,1,1) and (1,−1,1,−1) partially orthogonal to each other with which the same resources are associated is 4 (<12). Similarly, the difference between the repetition numbers associated with the inter-subframe orthogonal sequences (1,−1,−1,1) and (1,−1,1,−1) which are not partially orthogonal to each other with which different resources are associated is 24, while the difference between the repetition numbers associated with the inter-subframe orthogonal sequences (1,−1,−1,1) and (1, 1,−1,−1) partially orthogonal to each other with which the same resources are associated is 16 (<24).

The base station 100 allocates PUCCH resources to the terminals 200 in the MTC coverage enhancement mode, based on the setting of PUCCH resources shown in FIG. 15. The terminals 200 transmit response signals by using the PUCCH resources allocated by the base station 100.

With this configuration, inter-subframe orthogonal sequences partially orthogonal to each other and PUCCH resources constituted by the same resources are allocated to terminals 200 having a small difference in the repetition number. As discussed above, in terminals 200 to which inter-subframe orthogonal sequences partially orthogonal to each other are allocated, even though the same resources (combinations of cyclic shift indexes and intra-subframe orthogonal sequences) are used in the terminals 200, the inter-code interference between the inter-subframe orthogonal sequences partially orthogonal to each other is small. The inter-code interference between terminals 200 having a small difference in the repetition number (the difference in the received signal power is relatively small) is also small. As a result, the inter-code interference in the overall PUCCH resources can be suppressed.

As shown in FIG. 15, by associating the same resources with different inter-subframe orthogonal sequences, the number of usable PUCCH resources in each inter-subframe orthogonal sequence can be increased. More specifically, among the resources associated with each inter-subframe orthogonal sequence, the amount of (minimum) difference between the cyclic shift indexes used for the same intra-subframe orthogonal sequence is smaller than the sequence length of the inter-subframe orthogonal sequence. For example, in FIG. 15, while the sequence length of the inter-subframe orthogonal sequence is 4, the (minimum) difference between the cyclic shift indexes used for the same intra-subframe orthogonal sequence is 2. That is, in the fourth embodiment, the number of usable PUCCH resources is twice as many as that in the third embodiment (FIG. 14).

As described above, in comparison with the third embodiment, in the fourth embodiment, the number of usable PUCCH resources can be increased. It is also possible to reduce the transmission performance degradation caused by the inter-code interference in the MTC coverage enhancement mode.

The repetition numbers 4, 8, 16, and 32 are represented by $2^2$, $2^3$, $2^4$, and $2^5$, respectively, that is, $2^n$ (n is a natural number of two or greater). Accordingly, the difference in the repetition number may be considered as the difference in the value of n in $2^n$, that is, the difference in the exponent of a power representing the repetition number. In the example of FIG. 15, for example, the difference between the repetition numbers (difference in the exponent) associated with the inter-subframe orthogonal sequence (1,1,1,1) (repetition number: $2^2$) and the inter-subframe orthogonal sequence (1,1,−1,−1) (repetition number: $2^4$) which are not partially orthogonal to each other with which different resources are associated is 2, while the difference between the repetition numbers (difference in the exponent) associated with the inter-subframe orthogonal sequence (1,1,1,1) (repetition number: $2^2$) and the inter-subframe orthogonal sequence (1,−1,1,−1) (repetition number: $2^3$) partially orthogonal to each other with which the same resources are associated is 1 (<2).

In the third and fourth embodiments, by associating the repetition number with the inter-subframe orthogonal sequence, the base station 100 may implicitly indicate each terminal 200 of the inter-subframe orthogonal sequence. The terminal 200 simply specifies the inter-subframe orthogonal sequence associated with the repetition number indicated by the base station 100. With this configuration, the overhead of a control signal in a downlink can be reduced.

The values of the repetition number, the sequence lengths of ZAC sequences (values of cyclic shift indexes), the sequence lengths of intra-subframe orthogonal sequences, and the sequence lengths of inter-subframe orthogonal sequences used in the above-described first through fourth embodiments are only examples, and these numbers and lengths are not restricted thereto.

In the above-described embodiments, an aspect of the present disclosure is constituted by hardware. However, the present disclosure may be implemented by software in cooperation with hardware.

The functional blocks utilized for describing the above-described embodiments are implemented typically by a large scale integrated circuit (LSI), which is one example of integrated circuits. The integrated circuit may control the functional blocks in the above-described embodiments and may include input and output. These functional blocks may be formed into individual chips, or some or all of the functional blocks may be formed into one chip. Such an LSI may be called an IC, a system LSI, a super LSI, or an ultra LSI, depending on the integration degree.

The integration technology of the functional blocks is not restricted to an LSI technology. Instead, a dedicated circuit or a general-purpose processor may be used. For example, a field programmable gate array (FPGA) that is programmable after it is manufactured, or a reconfigurable processor that may reconfigure connections or settings of circuit cells within this processor may be used.

Further, due to the progress of semiconductor technologies or the appearance of a derivative technology, if a circuit integration technology which replaces an LSI technology is developed, the functional blocks may be integrated by utilizing such a technology. The application of a biotechnology, for example, may be one of such cases.

A communication device according to an aspect of the present disclosure includes a generator and a spreader. The generator repeats a response signal over multiple subframes in response to a data signal and multiplies the response signal in each of the multiple subframes by a corresponding one of components forming one of a plurality of first sequences orthogonal to each other. The spreader multiplies the response signal by a second sequence defined by one of a plurality of cyclic shift indexes and one of a plurality of third sequences orthogonal to each other. Among a plurality of resources, a resource associated with one of at least two first sequences of the plurality of first sequences is different from a resource associated with another one of the at least two first sequences. Each of the plurality of resources is constituted by one of the plurality of cyclic shift indexes and one of the plurality of third sequences.

In the communication device, a difference between cyclic shift indexes used for an identical third sequence and associated with at least two first sequences which are partially orthogonal to each other among the plurality of first sequences may be smaller than a difference between cyclic shift indexes used for an identical third sequence and associated with at least two first sequences which are not partially orthogonal to each other among the plurality of first sequences.

In the communication device, among the plurality of resources, a resource associated with one of at least two first sequences which are not partially orthogonal to each other among the plurality of first sequences may be different from a resource associated with another one of the at least two first sequences. Among the plurality of resources, a resource associated with one of at least two first sequences which are partially orthogonal to each other among the plurality of first sequences may be identical to a resource associated with another one of the at least two first sequences.

In the communication device, a difference between cyclic shift indexes used for an identical third sequence and associated with each of the plurality of first sequences may be smaller than a sequence length of the plurality of first sequences.

In the communication device, among the plurality of resources, a resource associated with each of the plurality of first sequences may be different from a resource associated with another one of the plurality of first sequences. A repetition number associated with each of the plurality of first sequences may be different from a repetition number associated with another one of the plurality of first sequences.

In the communication device, a repetition number associated with each of the plurality of first sequences may be different from a repetition number associated with another one of the plurality of first sequences. A difference between repetition numbers associated with at least two first sequences which are partially orthogonal to each other among the plurality of first sequences may be smaller than a difference between repetition numbers associated with at least two first sequences which are not partially orthogonal to each other among the plurality of first sequences.

In the communication device, among the plurality of resources, a resource associated with one of at least two first sequences which are partially orthogonal to each other among the plurality of first sequences may be identical to a resource associated with another one of the at least two first sequences, and a resource associated with one of at least two first sequences which are not partially orthogonal to each other among the plurality of first sequences may be different from a resource associated with another one of the at least two first sequences. A difference between repetition numbers associated with the at least two first sequences which are partially orthogonal to each other may be smaller than a difference between repetition numbers associated with the at least two first sequences which are not partially orthogonal to each other.

In the communication device, a repetition number associated with each of the plurality of first sequences may be different from a repetition number associated with another one of the plurality of first sequences.

A communication device according to an aspect of the present disclosure includes a transmitter and a receiver. The transmitter transmits a data signal. The receiver receives a response signal which is repeated over multiple subframes in response to the data signal. The response signal in each of the multiple subframes is multiplied by a corresponding one of components forming one of a plurality of first sequences orthogonal to each other. The response signal is multiplied by a second sequence defined by one of a plurality of cyclic shift indexes and one of a plurality of third sequences orthogonal to each other. Among a plurality of resources, a resource associated with one of at least two first sequences of the plurality of first sequences is different from a resource associated with another one of the at least two first sequences. Each of the plurality of resources is constituted by one of the plurality of cyclic shift indexes and one of the plurality of third sequences.

A transmitting method according to an aspect of the present disclosure includes: repeating a response signal over multiple subframes in response to a data signal and multiplying the response signal in each of the multiple subframes by a corresponding one of components forming one of a plurality of first sequences orthogonal to each other; and multiplying the response signal by a second sequence defined by one of a plurality of cyclic shift indexes and one of a plurality of third sequences orthogonal to each other. Among a plurality of resources, a resource associated with one of at least two first sequences of the plurality of first sequences is different from a resource associated with another one of the at least two first sequences. Each of the plurality of resources is constituted by one of the plurality of cyclic shift indexes and one of the plurality of third sequences.

A receiving method according to an aspect of the present disclosure includes: transmitting a data signal; and receiving a response signal which is repeated over multiple subframes in response to the data signal. The response signal in each of the multiple subframes is multiplied by a corresponding one of components forming one of a plurality of first sequences orthogonal to each other. The response signal is multiplied by a second sequence defined by one of a plurality of cyclic shift indexes and one of a plurality of third sequences orthogonal to each other. Among a plurality of resources, a resource associated with one of at least two first sequences of the plurality of first sequences is different from a resource associated with another one of the at least two first sequences. Each of the plurality of resources is constituted by one of the plurality of cyclic shift indexes and one of the plurality of third sequences.

An aspect of the present disclosure is suitably used in a mobile communication system.

What is claimed is:

1. A communication device, comprising:
   a generator that repeats a response signal over multiple subframes in response to a data signal and multiplies the response signal in each of the multiple subframes by a corresponding one of components forming one of a plurality of first sequences orthogonal to each other; and
   a spreader that multiplies the response signal by a second sequence defined by one of a plurality of cyclic shift indexes and one of a plurality of third sequences orthogonal to each other,
   wherein, among a plurality of resources, a resource associated with one of at least two first sequences of the plurality of first sequences is different from a resource associated with another one of the at least two first sequences, each of the plurality of resources being constituted by one of the plurality of cyclic shift indexes and one of the plurality of third sequences, and
   wherein the communication device secures physical uplink control channel (PUCCH) resources and suppresses transmission performance degradation.

2. The communication device according to claim 1, wherein a difference between cyclic shift indexes used for an identical third sequence and associated with at least two first sequences which are partially orthogonal to each other among the plurality of first sequences is smaller than a difference between cyclic shift indexes used for an identical third sequence and associated with at least two first sequences which are not partially orthogonal to each other among the plurality of first sequences.

3. The communication device according to claim 1, wherein:
   among the plurality of resources, a resource associated with one of at least two first sequences which are not partially orthogonal to each other among the plurality of first sequences is different from a resource associated with another one of the at least two first sequences; and
   among the plurality of resources, a resource associated with one of at least two first sequences which are partially orthogonal to each other among the plurality of first sequences is identical to a resource associated with another one of the at least two first sequences.

4. The communication device according to claim 1, wherein a difference between cyclic shift indexes used for an identical third sequence and associated with each of the plurality of first sequences is smaller than a sequence length of the plurality of first sequences.

5. The communication device according to claim 1, wherein:
   among the plurality of resources, a resource associated with each of the plurality of first sequences is different from a resource associated with another one of the plurality of first sequences; and
   a repetition number associated with each of the plurality of first sequences is different from a repetition number associated with another one of the plurality of first sequences.

6. The communication device according to claim 1, wherein:
   a repetition number associated with each of the plurality of first sequences is different from a repetition number associated with another one of the plurality of first sequences; and
   a difference between repetition numbers associated with at least two first sequences which are partially orthogonal to each other among the plurality of first sequences is smaller than a difference between repetition numbers associated with at least two first sequences which are not partially orthogonal to each other among the plurality of first sequences.

7. The communication device according to claim 1, wherein:
   among the plurality of resources, a resource associated with one of at least two first sequences which are partially orthogonal to each other among the plurality of first sequences is identical to a resource associated with another one of the at least two first sequences, and
   a resource associated with one of at least two first sequences which are not partially orthogonal to each other among the plurality of first sequences is different from a resource associated with another one of the at least two first sequences; and
   a difference between repetition numbers associated with the at least two first sequences which are partially orthogonal to each other is smaller than a difference between repetition numbers associated with the at least two first sequences which are not partially orthogonal to each other.

8. The communication device according to claim 1, wherein a repetition number associated with each of the plurality of first sequences is different from a repetition number associated with another one of the plurality of first sequences.

9. A communication device, comprising:
   a transmitter that transmits a data signal; and
   a receiver that receives a response signal which is repeated over multiple subframes in response to the data signal, the response signal in each of the multiple subframes being multiplied by a corresponding one of components forming one of a plurality of first sequences orthogonal to each other, the response signal being multiplied by a second sequence defined by one of a plurality of cyclic shift indexes and one of a plurality of third sequences orthogonal to each other,
   wherein, among a plurality of resources, a resource associated with one of at least two first sequences of the plurality of first sequences is different from a resource associated with another one of the at least two first sequences, each of the plurality of resources being constituted by one of the plurality of cyclic shift indexes and one of the plurality of third sequences, and
   wherein the communication device secures physical uplink control channel (PUCCH) resources and suppresses transmission performance degradation.

10. A transmitting method, comprising:
    repeating a response signal over multiple subframes in response to a data signal and multiplying the response signal in each of the multiple subframes by a corresponding one of components forming one of a plurality of first sequences orthogonal to each other; and
    multiplying the response signal by a second sequence defined by one of a plurality of cyclic shift indexes and one of a plurality of third sequences orthogonal to each other, wherein, among a plurality of resources, a resource associated with one of at least two first sequences of the plurality of first sequences is different from a resource associated with another one of the at least two first sequences, each of the plurality of resources being constituted by one of the plurality of cyclic shift indexes and one of the plurality of third sequences, and wherein physical uplink control channel (PUCCH) resources are secured and transmission performance degradation is suppressed.

11. A receiving method, comprising:

transmitting a data signal; and receiving a response signal which is repeated over multiple subframes in response to the data signal, the response signal in each of the multiple subframes being multiplied by a corresponding one of components forming one of a plurality of first sequences orthogonal to each other, the response signal being multiplied by a second sequence defined by one of a plurality of cyclic shift indexes and one of a plurality of third sequences orthogonal to each other, wherein, among a plurality of resources, a resource associated with one of at least two first sequences of the plurality of first sequences is different from a resource associated with another one of the at least two first sequences, each of the plurality of resources being constituted by one of the plurality of cyclic shift indexes and one of the plurality of third sequences, and wherein physical uplink control channel (PUCCH) resources are secured and transmission performance degradation is suppressed.

* * * * *